(12) United States Patent
Nakanishi

(10) Patent No.: US 6,952,252 B2
(45) Date of Patent: Oct. 4, 2005

(54) SUBSTRATE FOR LIQUID CRYSTAL DISPLAY AND LIQUID CRYSTAL DISPLAY UTILIZING THE SAME

(75) Inventor: Yohei Nakanishi, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 10/113,149

(22) Filed: Mar. 29, 2002

(65) Prior Publication Data

US 2003/0086044 A1 May 8, 2003

(30) Foreign Application Priority Data

Oct. 2, 2001 (JP) ........................................ 2001-306827

(51) Int. Cl.[7] ........................ C09K 19/02; C09K 19/52
(52) U.S. Cl. ................................. 349/182; 252/299.01
(58) Field of Search ................ 349/1, 182; 252/299.01, 252/299.62

(56) References Cited

FOREIGN PATENT DOCUMENTS

| JP | 06-347795 | 12/1994 |
|----|-----------|---------|
| JP | 07-146485 | 6/1995 |
| JP | 08-015707 | 1/1996 |
| JP | 09-160051 | 6/1997 |
| JP | 10-036847 | 2/1998 |
| JP | 11-183881 | 7/1999 |
| JP | 2000-162599 | 6/2000 |
| JP | 2000-221525 | 8/2000 |
| JP | 2001-033815 | 2/2001 |
| JP | 2001-100212 | 4/2001 |

OTHER PUBLICATIONS

Kataoka et al., "Liquid–Crystalline Polymer–Stabilized FLCDs Exhibiting an Excellent Bistability or Quasi–Electroclinic Effect", 1996 SID International Symposium, Digest of Technical Papers, 1 st Ed. Santa Ana, CA, Soc. Inf. Display, 1996, pp. 699–702. Conference: San Diego, CA, May 12–17, 1996.

Primary Examiner—Dung T. Nguyen
(74) Attorney, Agent, or Firm—Greer, Burns & Crain, Ltd.

(57) ABSTRACT

It is an object of the invention to provide a substrate for a liquid crystal display having optical transmittance improved without reducing the speed of a response to a tone change and a liquid crystal display utilizing the same. There is provided a drain bus line formed on an array substrate which sandwiches a liquid crystal in combination with an opposite substrate provided in a face-to-face relationship therewith, a TFT connected to the drain bus line, and a pixel electrode which has stripe-shaped electrodes, along with spaces, connected to the TFT and provided in parallel with the drain bus line, stripe-shaped electrodes in the vicinity of the drain bus line having an electrode width formed narrower than the width of internal electrodes located inside the same.

6 Claims, 30 Drawing Sheets

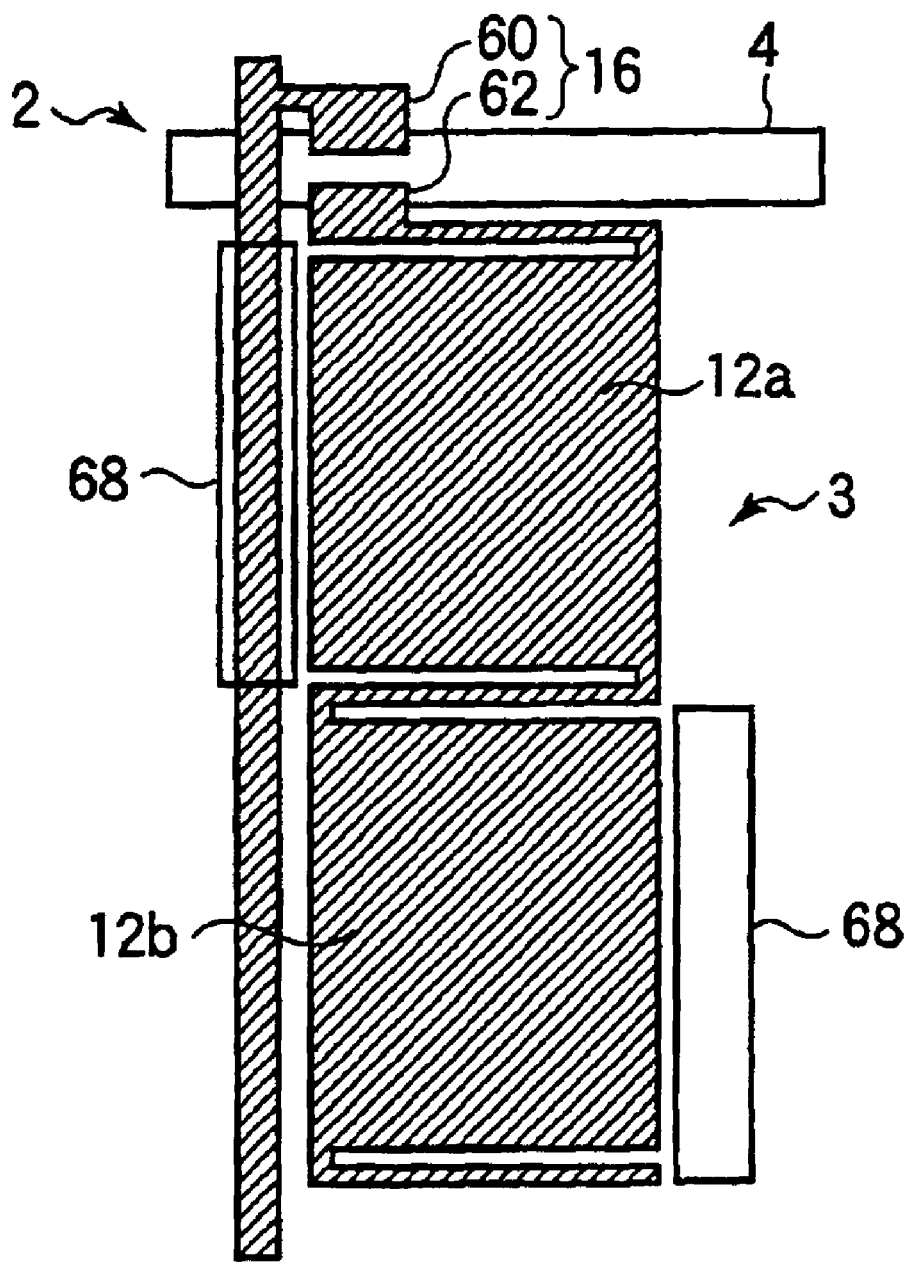

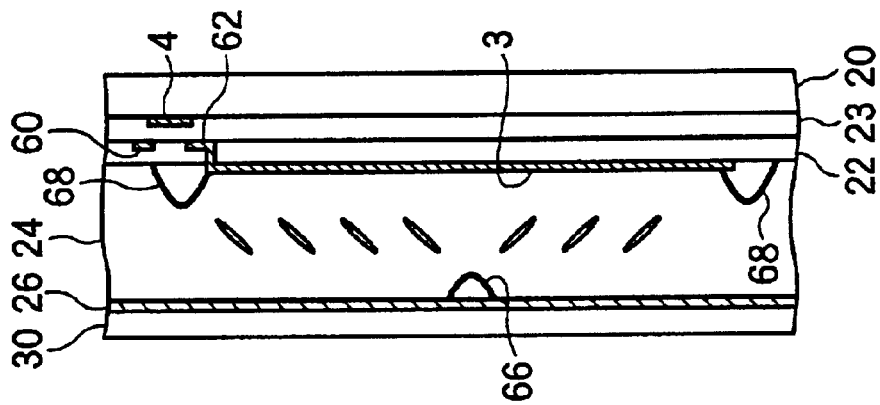
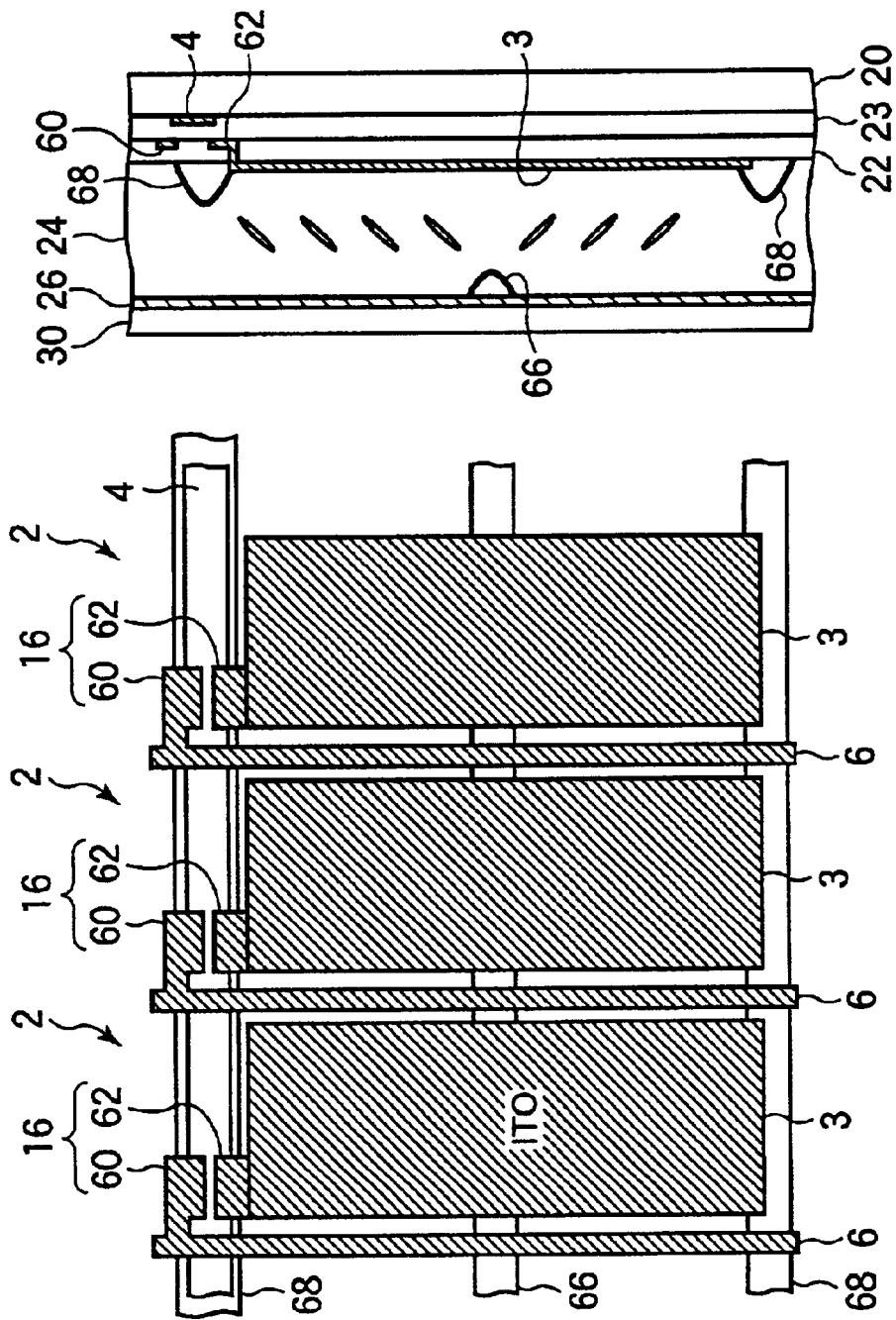

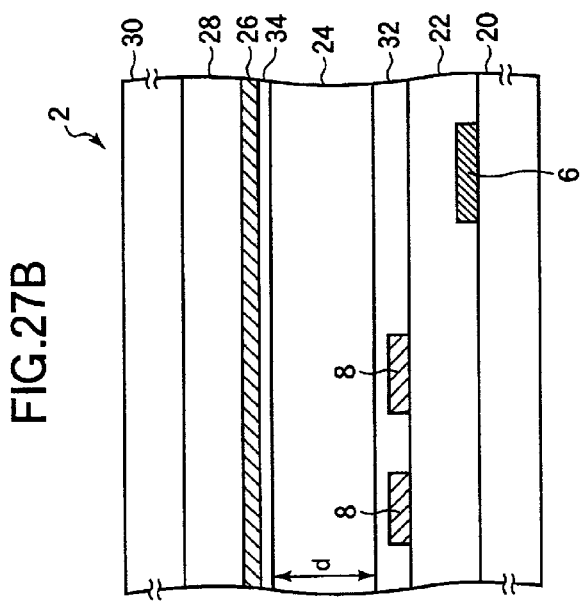
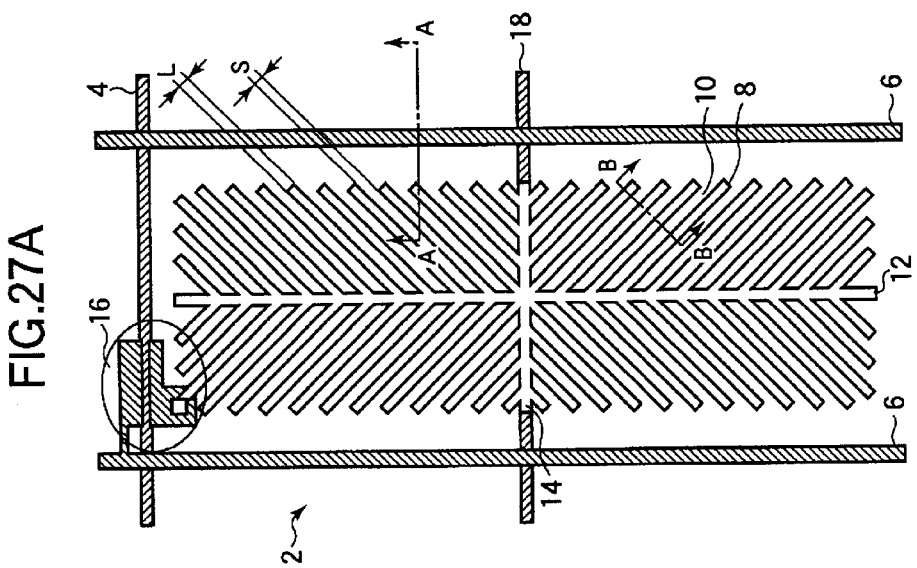

FIG.30
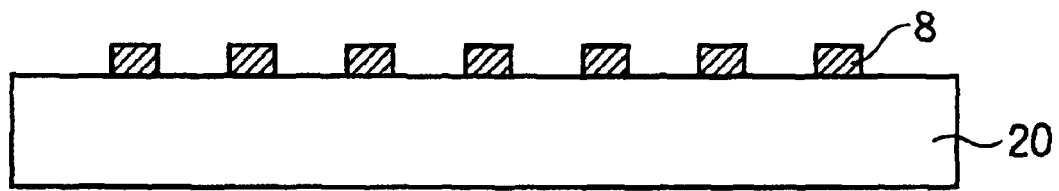

L/S=2/4, APPLIED VOLTAGE=3V

L/S=3/3, APPLIED VOLTAGE=3V

L/S=3.5/2.5, APPLIED VOLTAGE=3V

L/S=4/2, APPLIED VOLTAGE=3V

FIG.44A 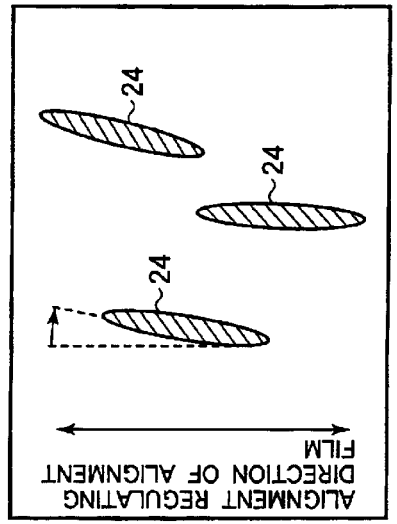 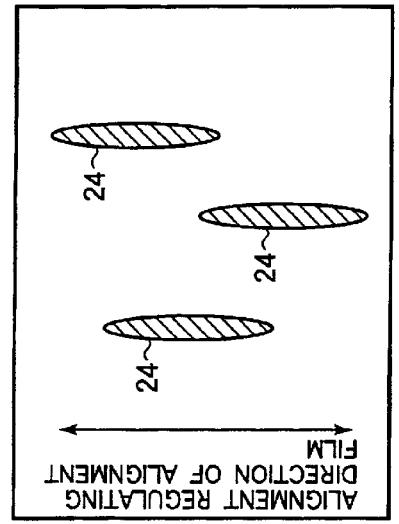
FIG.44B 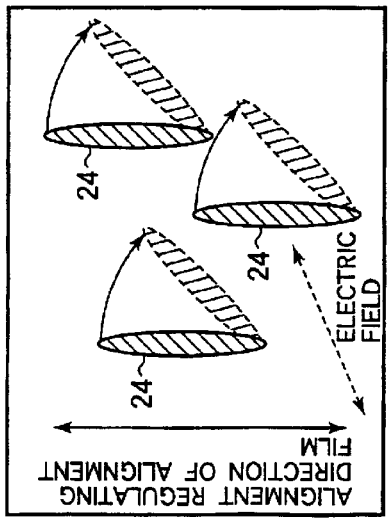 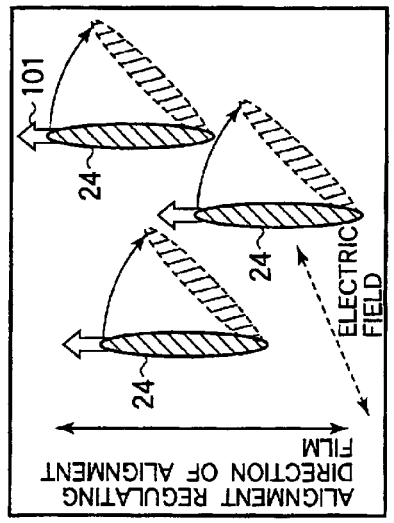

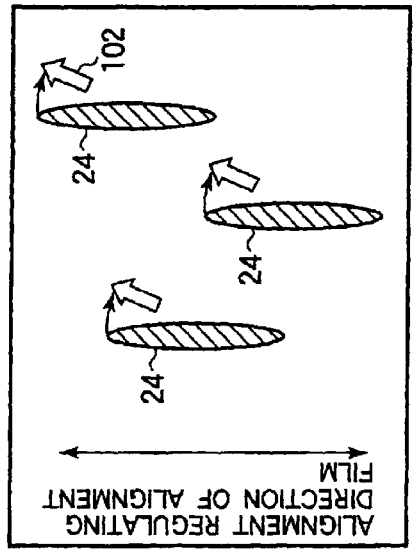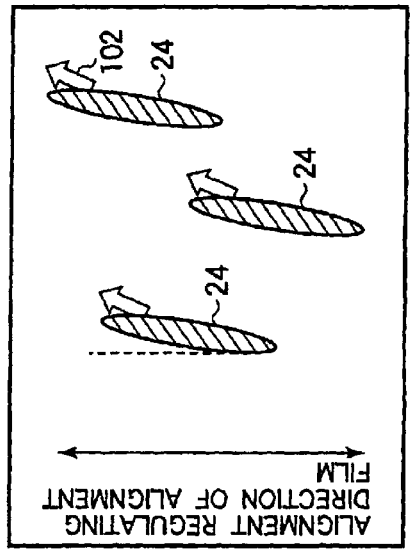
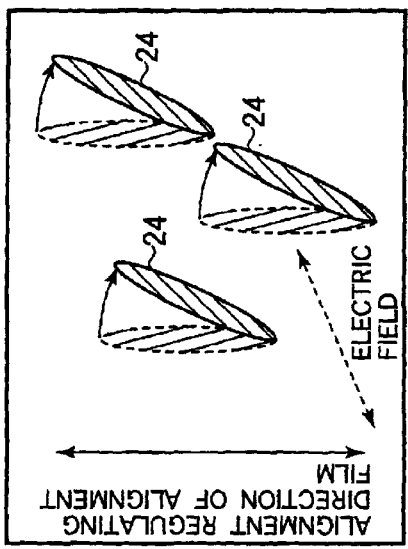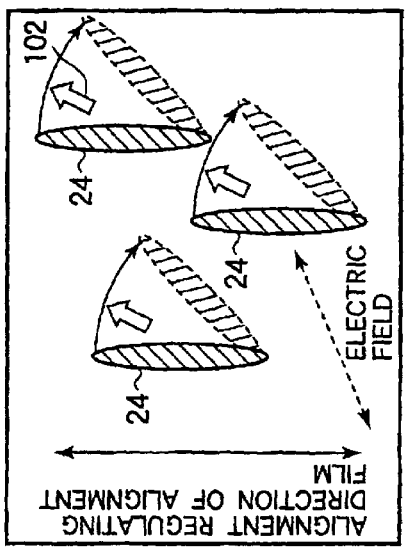
FIG.45A
FIG.45B

SUBSTRATE FOR LIQUID CRYSTAL DISPLAY AND LIQUID CRYSTAL DISPLAY UTILIZING THE SAME

BACKGROUND OF THE INVENTION

1. Field of the Invention

The present invention relates to a substrate for a liquid crystal display and a liquid crystal display utilizing the same and, more particularly, to a substrate for a liquid crystal display in the VA (vertically aligned) mode in which a liquid crystal having negative dielectric anisotropy is vertically aligned, IPS (in-plane switching) mode in which a transverse electric field is applied to a horizontally aligned liquid crystal having positive dielectric anisotropy, or the like, the invention further relating to a liquid crystal display utilizing the same.

The present invention also relates to a liquid crystal display in which a liquid crystal layer including polymeric components (a monomer and an oligomer) that are optically or thermally polymerized are sealed between substrates and in which the alignment of the liquid crystal is fixed by polymerizing the polymeric components while adjusting a voltage applied to the liquid crystal layer (the applied voltage may be 0 (zero) and, hereinafter, this operation may be simply expressed as "while applying a voltages" depending on situations), the invention also relating to a substrate used for such a liquid crystal display.

2. Description of the Related Art

Multi-domain vertical alignment mode liquid crystal displays(hereinafter simply referred to as "MVA-LCDs") are known in which a liquid crystal having negative dielectric anisotropy is vertically aligned and in which banks (linear protrusions) on the substrate or cutouts (slits) in electrodes are provided as alignment regulating structures. Since alignment regulating structures are provided, the liquid crystal can be controlled such that it is aligned in a plurality of aligning directions when a voltage is applied without any need for a rubbing process on an alignment film. Such MVA-LCDs have better viewing angle characteristics compared to conventional TN (twisted nematic) mode LCDs.

However, conventional MVA-LCDs have a problem in that they appear dark when displaying white because of low luminance. This is primarily attributable to the fact that transmittance decreases to result in dark appearance when white is displayed because dark lines appear above protrusions or slits which serve as boundaries for alignment separation. Although this problem can be mitigated by keeping sufficiently large intervals between the protrusions or slits, since this results in a reduction in the number of the protrusions or slits which are alignment regulating structures, a longer time will be required to fix the alignment of the liquid crystal after applying a predetermined voltage to the same, which results in the problem of a low response speed.

In order to mitigate this problem and to provide MVA-LCDs having high luminance and capable of high speed response, the use of a polymer-fixing method has been proposed. According to the polymer-fixing method, a liquid crystal compound obtained by mixing polymeric components such as a monomer and an oligomer (hereinafter simply represented by "monomer") in a liquid crystal is sealed between substrates. The monomer is polymerized with liquid crystal molecules tilted by applying a voltage between the substrates. As a result, a liquid crystal layer tilted at a predetermined pre-tilt angle is obtained even after terminating the application of the voltage, which makes it possible to fix the alignment of the liquid crystal. Referring to the monomer, a material that is polymerized by heat or light (ultraviolet light) is chosen.

However, the polymer-fixing method has some problems associated with irregularities in display when an image is displayed on an LCD thus completed. The first problem is that irregularities are caused in the display of an image on the completed LCD by abnormality in the alignment of the liquid crystal that locally occurs when the liquid crystal is driven to polymerize the monomer.

IPS mode liquid crystal displays (hereinafter simply referred to as "IPS-LCDs") in which a horizontal field is applied to a horizontally aligned liquid crystal having positive dielectric anisotropy have preferable viewing angle characteristics similarly to MVA-LCDs. However, since liquid crystal molecules are switched in a horizontal plane with comb-shaped electrodes in an IPS-LCD, there is a need for a back-light unit having high optical intensity because of a significant reduction in the aperture ratio of the pixels attributable to the comb-shaped electrodes.

The panel of an MVA-LCD has optical transmittance lower than that of a TN mode LCD, although it is subjected to a less significant reduction in the substantial aperture ratio of the pixels attributable to the protrusions or slits compared to that in an IPS-LCD attributable to the comb-shaped electrodes. For such reasons, presently, neither MVA-LCD nor IPS-LCD is used in substantially notebook type personal computer for which low power consumption is a must.

In a current MVA-LCD, in order to tilt liquid crystal molecules in four directions when a voltage is applied to achieve a wide viewing angle, a multiplicity of linear protrusions or slits that are linear cutouts in a part of a pixel electrode are provided in a pixel in a complicated configuration. This reduces the optical transmittance of the pixel.

A description will now be made on an alignment regulating operation in a case wherein large intervals are kept between adjoining linear protrusions with a simple configuration in order to mitigate the problem. FIGS. 14A and 14B show an MVA-LCD having two separately aligned regions. FIG. 14A shows a pixel 2 of the MVA-LCD as viewed in the normal direction of the substrate surfaces. FIG. 14B shows a section of the MVA-LCD shown in FIG. 14A taken in parallel with drain bus lines 6. FIG. 14A shows three pixels 2 corrected to one gate bus line 4. As shown in FIGS. 14A and 14B, two linear protrusions 68 extending in parallel with the gate bus line 4 are formed in the vicinity of both ends of pixel electrodes 3 located on a side of the gate bus line 4. A linear protrusion 66 extending in parallel with the gate bus line 4 is formed in a region of a common electrode on an opposite substrate, the region including central regions of the pixels. Referring to an array substrate, an insulation film (gate insulation film) 23 is formed on a glass substrate 20 and the gate bus line 4, and an insulation film 22 is formed on the same.

In this configuration, when a voltage is applied between the pixel electrodes 3 and the common electrode 26 to change the distribution of an electric field in a liquid crystal layer 24, liquid crystal molecules 24a having negative dielectric anisotropy are tilted in two directions. Specifically, the liquid crystal molecules 24a are tilted in directions from the linear protrusions 68 on both sides of the pixels 2 on a side of the gate bus line 4 to the linear protrusion 66 on the opposite substrate. As a result, a multi-domain is formed which is divided into two parts, i.e., upper and lower parts. In the MVA mode, the tilting direction of the liquid crystal molecules 24a is sequentially determined by an electric field generated by the linear protrusions (or slits) starting with molecules located in the vicinity of the linear protrusions 66 and 68 (or in the vicinity of the slits). Therefore, when the intervals between the linear protrusions (or slits) are very large as shown in FIGS. 14A and 14B, the response of the liquid crystal molecules to the application of a voltage becomes very slow because the propagation of the tilt of the liquid crystal molecules 24a takes time.

A possible solution to this is to use the polymer-fixing method in which a liquid crystal layer 24 including a monomer that can be polymerized instead of the conventional liquid crystal material is employed. According to the polymer-fixing method, the monomer is polymerized with a voltage applied to the liquid crystal layer 24, and the resultant polymer is cause to memorize the tilting direction of the liquid crystal molecules 24a.

However, when a voltage is applied to the liquid crystal layer 24 in the structure shown in FIGS. 14A and 14B, liquid crystal molecules 24a in the vicinity of the drain bus lines 6 are tilted in a direction that is 90 deg. different from the intended tilting direction because of electric fields generated at the edges of the pixel electrodes 3 in the vicinity of the drain bus lines 6. As a result, even if the polymer-fixing method is adopted, large dark parts X1 extending along the drain bus line 6 outside a black matrix BM will be recognized at each of the display pixels 2 as shown in FIG. 15 that is a microscopic view of the MVA-LCD in the normal direction of the substrate surfaces.

In order to solve this, in a previous application filed by the present applicant (Japanese patent application No. 2001-264117 filed on Aug. 31, 2001), a proposal was made in which pixel electrodes 3 on an array substrate having TFTs 16 formed thereon are stripe-shaped electrodes in a line-and-space pattern. By way of example, FIG. 16 shows an embodiment in which a pixel 2 of an MVA-LCD is viewed in the normal direction of the substrate surfaces. As shown in FIG. 16, a pixel electrode 3 has stripe-shaped electrodes 8 and spaces 10 formed in a line-and-space pattern in parallel with a drain bus line 6.

In general, an alignment regulating force provided by an alignment film acts only on liquid crystal molecules 24a in contact with the alignment film and does not act on liquid crystal molecules in the middle of the device in the direction of the cell gap. Therefore, the aligning direction of liquid crystal molecules 24a in the middle of the device in the direction of the cell gap is significantly affected and disturbed by electric fields generated at an edge of a pixel. In the case of the pixel electrode 3 having the stripe-shaped electrodes 8 and spaces 10 in parallel with the drain bus line 6, liquid crystal molecules 24a are tilted in parallel with the stripe-shaped electrodes 8 and spaces 10 when a voltage is applied. Further, since the tilting direction of all liquid crystal molecules 24a is determined by the stripe-shaped electrodes 8 and spaces 10, the influence of a transverse electric field generated at an edge of the pixel can be minimized.

The liquid crystal display proposed in the above-mentioned application and a method of manufacturing the same will now be specifically described. FIG. 16 shows the pixel 2 of the MVA-LCD according to the proposal as viewed in the normal direction of the substrate surfaces, and FIG. 17 shows a sectional configuration taken along the line D—D in FIG. 16. As shown in FIG. 16, the pixel electrode 3 has the stripe-shaped electrodes 8 and spaces 10 formed in a line-and-space pattern in parallel with the drain bus line 6.

The stripe-shaped electrodes 8 are electrically connected by a connection electrode 64 formed in the middle of the pixel 2 substantially in parallel with a gate bus line 4. Some of the stripe-shaped electrodes 8 are connected to a source electrode 62 provided in a face-to-face relationship with a drain electrode 60 of a TFT 16.

As shown in FIG. 17, a linear protrusion 66 extending in parallel with the gate bus line 4 is formed on an opposite substrate in a position in a face-to-face relationship with the connection electrode 64 in the middle of the pixel region. The aligning direction of liquid crystal molecules 24a can be more strongly determined by the linear protrusion 66.

Obviously, a rubbing process may be performed on an alignment film on the array substrate or opposite substrate instead of providing the linear protrusion 66 on the opposite substrate. In this case, both of regions B and C of the array substrate shown in FIG. 16 are rubbed toward the connection electrode 64 as indicated by the arrows in FIG. 17. The opposite substrate is rubbed in the directions of becoming apart from the connection electrode 64. An optical method of alignment may be alternatively used.

The panel structure shown in FIGS. 16 and 17 was used to irradiate the liquid crystal layer 24 with light with the liquid crystal molecules 24a in the pixel 2 tilted in a predetermined direction by applying a voltage to the liquid crystal layer 24 added with a photo-polymeric monomer. The monomer was thus polymerized to fix the pre-tilt angle and/or alignment of the liquid crystal molecules 24a. The completed MVA-LCD was driven for display, and an observation of the display area revealed that an improvement of transmittance had been achieved over the related art in that the dark parts X1 had disappeared to allow light to be transmitted through the entire pixel regions.

In the structure proposed in the above-mentioned application, however, liquid crystal molecules located above the spaces 10 are not aligned (tilted) because they are not sandwiched by electrodes from above and below and are not directly subjected to an electric field, although the alignment of the liquid crystal layer is fixed. This results in a problem in that a reduction in transmittance occurs in the vicinity of the spaces 10. Thus, although the structure shown in FIG. 16 allows better fixation of the alignment of a liquid crystal compared to the structure shown in FIGS. 14A and 14B and improves the transmittance of a peripheral region of a pixel by preventing the occurrence of dark parts X1 as shown in FIG. 15, it has a problem in that it can not improve the transmittance of a pixel as a whole dramatically because the optical transmittance of a pixel is conversely reduced in a region inside the peripheral region.

SUMMARY OF THE INVENTION

It is an object of the invention to provide a substrate for a liquid crystal display whose optical transmittance is improved without any reduction in the response speed of the same at a transition between tones and a liquid crystal display utilizing the same.

The above-described object is achieved by a substrate for a liquid crystal display, characterized in that it comprises a substrate which sandwiches a liquid crystal in combination with an opposite substrate provided in a face-to-face relationship therewith, a bus line formed on the substrate, a switching element connected to the bus line, and a pixel electrode having stripe-shaped electrodes, along with spaces therebetween, connected to the switching element and provided in parallel with the bus line, at least one of stripe-shaped electrode in the vicinity of the bus line being formed with an electrode width narrower than that of electrodes located inside the same.

BRIEF DESCRIPTION OF THE DRAWINGS

FIG. 13 shows a modification of the MVA-LCD of Embodiment 1-4 in the first mode for carrying out the invention;

FIGS. 14A and 14B show an MVA-LCD having two separately aligned regions. FIG. 14A shows a pixel 2 of the MVA-LCD as viewed in the normal direction of the substrate surfaces, and FIG. 14B shows a section of the MVA-LCD shown in FIG. 14A taken in parallel with a drain bus line 6;

FIGS. 27A and 27B show previously proposed alignment control structures;

FIG. 30 shows a section taken along the line E—E in FIG. 29;

FIGS. 44A and 44B illustrate a principle of a liquid crystal display in a seventh mode for carrying out the invention;

FIGS. 45A and 45B illustrate the principle of the liquid crystal display in the seventh mode for carrying out the invention;

DETAILED DESCRIPTION OF THE PREFERRED EMBODIMENTS

[First Mode for Carrying Out the Invention]

A description will now be made with reference to FIGS. 1 through 13 on a substrate for a liquid crystal display in a first mode for carrying out the invention and a liquid crystal display utilizing the same. A pixel electrode 3 of a liquid crystal display in the present mode for carrying out the invention has stripe-shaped electrodes 8 and spaces 10 which are formed in parallel with a drain bus line 6 or gate bus line 4. Stripe-shaped electrodes 8 in the vicinity of the bus line are formed with an electrode width narrower than that of stripe-shaped electrodes located internally to the same. The present mode is characterized in that the total area of the spaces 10 is 50% or less of the total area of the pixel electrode 3 (total area of the electrode region) that is the sum of the total area of the spaces 10 and the total area of electrodes including the stripe-shaped electrodes 8.

Further, when two separate alignments are to be achieved in the direction in which the drain bus line 6 extends, the stripe-shaped electrodes 8 are provided only in the vicinity of a pixel peripheral region close to the drain bus line 6. When two separate alignments are to be achieve in the direction in which the gate bus line 4 extends, the stripe-shaped electrodes 8 are provided only in the vicinity of a pixel peripheral region close to the gate bus line 6 and in the vicinity of the boundary for alignment separation.

Figure 1:
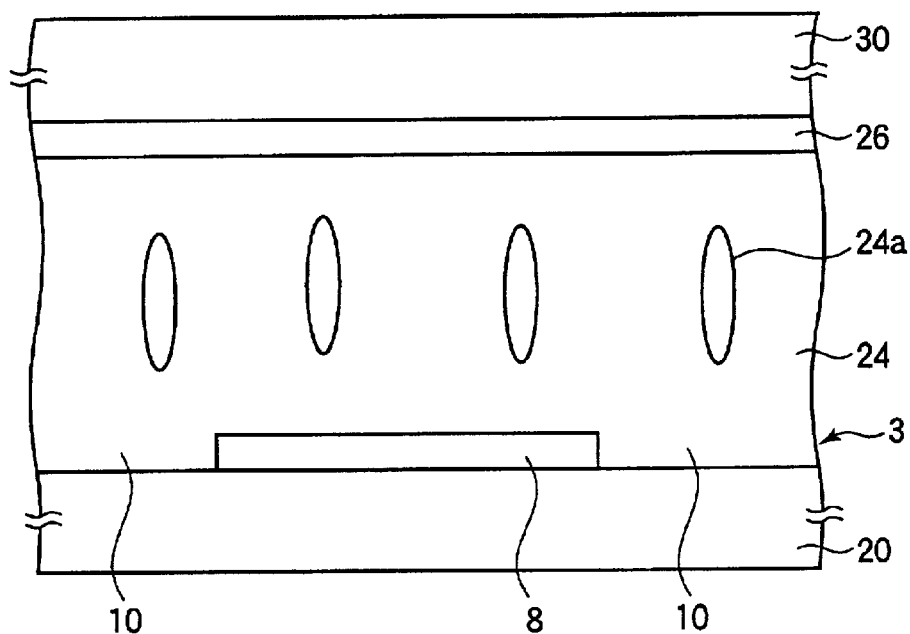
FIG. 1 is a first illustration for explaining a principle for determining a structure of a pixel electrode 3 in a first mode for carrying out the invention.

A description will now be made with reference to FIGS. 1 through 4 on a principle on which a structure of a pixel electrode 3 in the present mode for carrying out the invention is determined. FIG. 1 shows a section of a part of a VA-LCD taken in a direction perpendicular to the substrate surfaces. In FIG. 1, a pixel electrode 3 is formed on a glass substrate 20 which is an insulation substrate on an array substrate on which switching elements such as TFTs are formed. The pixel electrode 3 is a combination of stripe-shaped electrodes 8 and spaces 10, and stripe-shaped electrodes 8 and spaces 10 are also alternately formed in regions (not shown) in the horizontal direction in the figure. In this example, the stripe-shaped electrodes 8 have a width L of 3 μm, and the spaces 10 have a width S of 3 μm. A common electrode 26 is formed on a side of a liquid crystal layer on a glass substrate 30 of an opposite substrate which is provided in a face-to-face relationship with the glass substrate 20 of the array substrate to sandwich a liquid crystal layer 24.

Vertical alignment films (not shown) are formed at the interfaces between the glass substrates 20 and 30 and the liquid crystal layer 24. The liquid crystal layer 24 contains a liquid crystal material having negative dielectric anisotropy added with a photo-polymeric monomer.

In the VA-LCD having such a configuration, when a voltage is applied between the stripe-shaped electrodes 8 and common electrode 26 to change the intensity of an electric field acting on liquid crystal molecules 24a in the liquid crystal layer 24, transmittance can be changed by changing the tilt angle of the liquid crystal molecules 24a depending on the field intensity.

Figure 2:
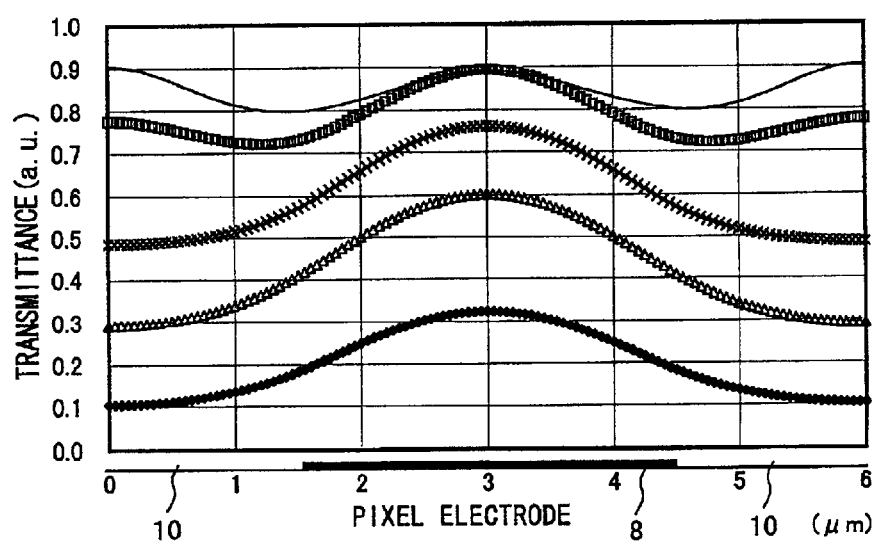
FIG. 2 is a second illustration for explaining the principle for determining a structure of a pixel electrode 3 in the first mode for carrying out the invention.

FIG. 2 is a graph showing changes in transmittance relative to changes in the voltage applied between the stripe-shaped electrodes 8 and common electrode 26. The positions of the stripe-shaped electrode 8 and spaces 10 in the horizontal direction of the glass substrate 20 of the VA-LCD shown in FIG. 1 are shown on the abscissa axis. Transmittance is shown on the ordinate axis. In FIG. 2, the curve indicated by consecutive symbols "♦" indicates distribution of transmittance at an applied voltage of 3 V; the curve represented by consecutive symbols "Δ" indicates distribution of transmittance at an applied voltage of 3.5 V; the curve represented by consecutive symbols "x" indicates distribution of transmittance at an applied voltage of 4 V; the curve represented by consecutive symbols "□" indicates distribution of transmittance at an applied voltage of 5.4 V; and the curve represented by consecutive symbols "-" (solid lines) indicates distribution of transmittance at an applied voltage of 10 V. Any of them indicates distribution of transmittance at a point in time that is 500 ms after the application of the voltage.

As shown in FIG. 2, while an increase in the applied voltage results in a corresponding increase in transmittance, in any case, the maximum value is obtained at the center of the stripe-shaped electrode 8 and the minimum value is obtained at the centers of the spaces 10. That is, when the pixel electrode 3 is a combination of stripe-shaped electrodes 8 and spaces 10 as shown in FIG. 1, there is a difference between the intensity of the field above the stripe-shaped electrodes 8 and the intensity of the field above the spaces 10 at an application of a voltage, and the intensity of the field above the spaces 10 is relatively smaller, which results in a reduction of transmittance in the vicinity of the spaces 10. As a result, the transmittance of the pixel as a whole is not increased in spite of the fact that dark parts X1 at peripheral edges of the pixel electrode 3 in the vicinity of the drain bus line 6 disappear. For example, in FIG. 2, while average transmittance at the applied voltage of 5.4 V represented by the curve indicated by the symbols "□" is 0.784, a pixel electrode 3 in a "solid" structure excluding the spaces 10 to be described later will have average transmittance of 0.897 (see FIG. 4), which means that the "solid" structure provides higher luminance because of a difference of about 14% (0.897/0.784=1.14) in luminance.

Figure 3:
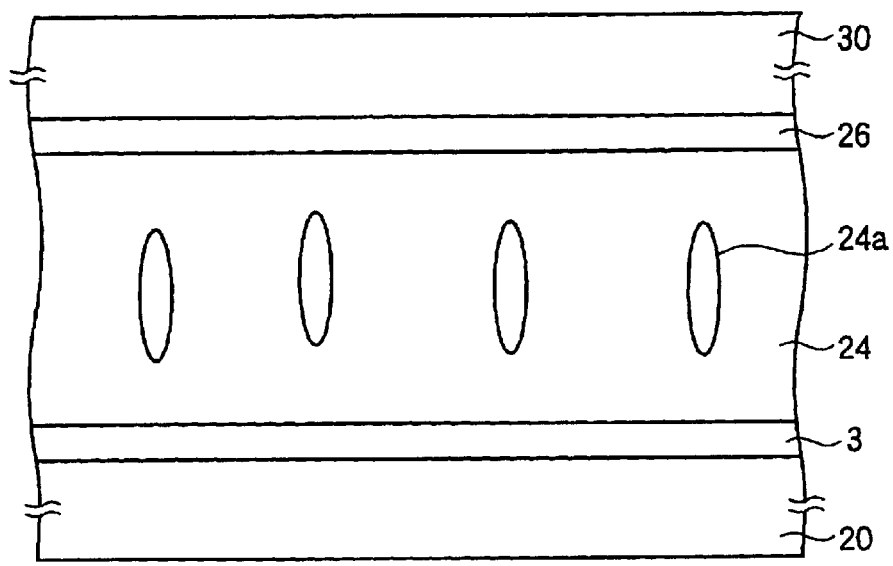
FIG. 3 is a third illustration for explaining the principle for determining a structure of a pixel electrode 3 in the first mode for carrying out the invention.
Figure 4:
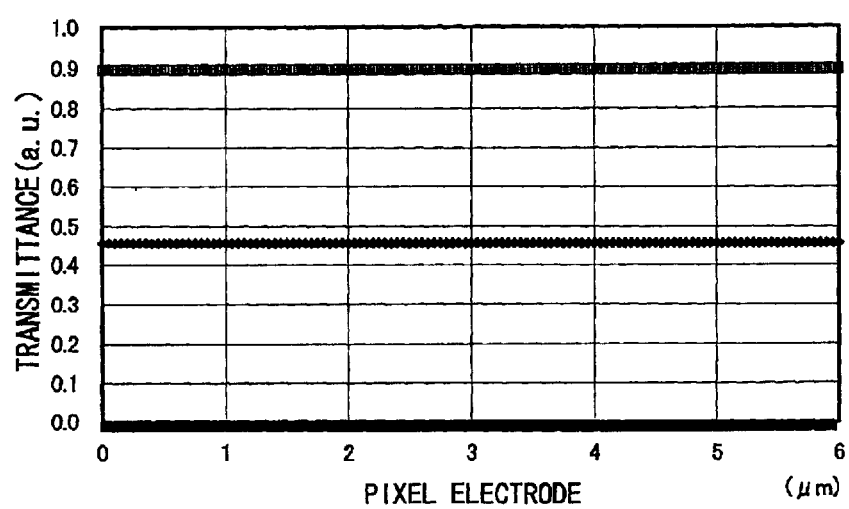
FIG. 4 is a fourth illustration for explaining the principle for determining a structure of a pixel electrode 3 in the first mode for carrying out the invention.

FIG. 3 shows a VA-LCD whose configuration is identical to that in FIG. 1 except that a pixel electrode 3 is uniformly formed in each pixel region. FIG. 4 is a graph showing changes in transmittance relative to changes in a voltage applied between a pixel electrode 3 and a common electrode 26. The abscissa axis corresponds to the horizontal direction of a glass substrate 20 of the VA-LCD shown in FIG. 3 and represents a pixel electrode 3 located substantially in the middle of a pixel region. Transmittance is shown on the ordinate axis. In FIG. 4, the curve indicated by consecutive symbols "ø" indicates distribution of transmittance at an applied voltage of 3 V; the curve represented by consecutive symbols "□" indicates distribution of transmittance at an applied voltage of 5.4 V; and the curve represented by consecutive symbols "-" (solid lines) indicates distribution of transmittance at an applied voltage of 10 V. Any of them indicates distribution of transmittance at a point in time that is 500 ms after the application of the voltage.

As shown in FIG. 4, while an increase in the applied voltage results in a corresponding increase in transmittance, any of the distributions of transmittance is flat regardless of the magnitude of the applied voltage, and no change appears in the same in any position of the substrate. That is, when the pixel electrode 3 has a "solids" structure including no space 10 as shown in FIG. 3, uniform transmittance can be achieved because the pixel electrode 3 has a flat field intensity in the middle of the same when a voltage is applied.

Figure 15:
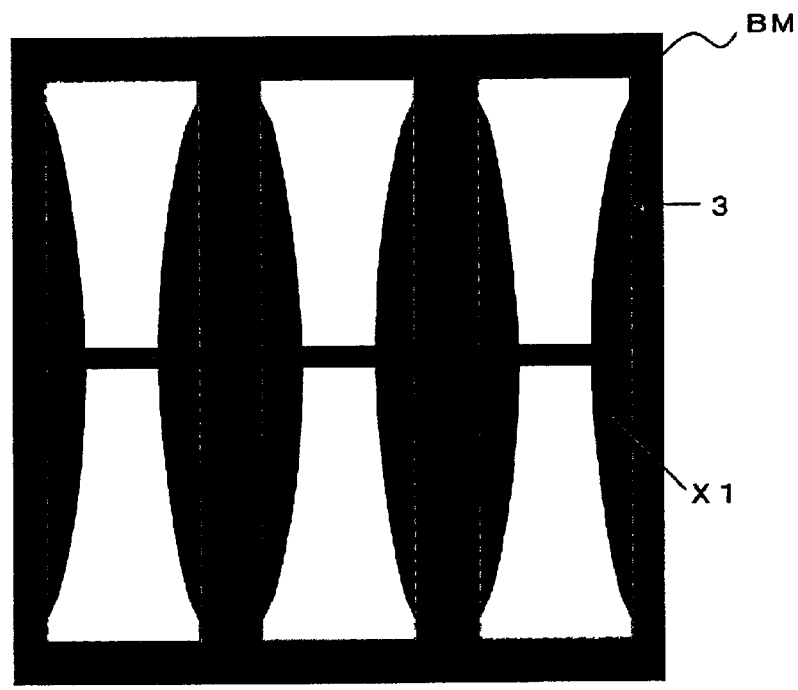
FIG. 15 is a microscopic view of a pixel of the MVA-LCD in the normal direction of the substrate surfaces.

However, as already described with reference to FIGS. 14A, 14B, and 15, when the pixel electrode 3 has a "solid" structure including no space 10, since dark parts X1 are formed in peripheral edges of the pixel electrode 3 in the vicinity of a drain bus line 6, the transmittance of the pixel as a whole decreases.

Specifically, an increase in the ratio of spaces 10 in a pixel electrode 3 does not result in a great increase in transmittance, although the alignment of a liquid crystal layer 24 is improved. On the contrary, when the ratio occupied by the spaces 10 is too small, the alignment of the liquid crystal layer 24 becomes more irregular to reduce transmittance.

That is, transmittance can be maximized by keeping the total area of the spaces 10 at an optimum ratio to the total area of the spaces 10, stripe-shaped electrodes 8 and any other electrode or the total area of the pixel electrode 3. A close empirical study revealed that the alignment of the liquid crystal layer 24 can be improved to achieve high transmittance when the ratio of the spaces 10 is in the range from 4 to 50%.

When two separate alignments are to be achieved in the direction in which the drain bus line 6 extends to suppress the generation of the dark parts X1, the stripe-shaped electrodes 8 may be provided at least in the peripheral region of the pixel close to the drain bus line 6. When two separate alignments are to be achieved in the direction in which the gate bus line 4 extends, the stripe-shaped electrodes 8 are provided at least in the peripheral region of the pixel close to the gate bus line 4 and in the vicinity of the boundary for alignment separation.

Liquid crystal displays in the present mode for carrying out the invention will now be specifically described with reference to preferred embodiments of the invention. Conditions commonly applied to all of the following embodiments are as follows.

Alignment film: vertical alignment film
Liquid crystal: a liquid crystal having negative dielectric anisotropy and added with a photo-polymeric monomer
Polarizer: polarizers provided on both sides of a liquid crystal panel in a crossed Nicols configuration to achieve the normally black mode
Polarizing axis of polarizers: 45 deg. to a bus line
Liquid crystal panel: 15 inches in the diagonal direction
Resolution: according to XGA specifications

[Embodiment 1—1]

Figure 5:
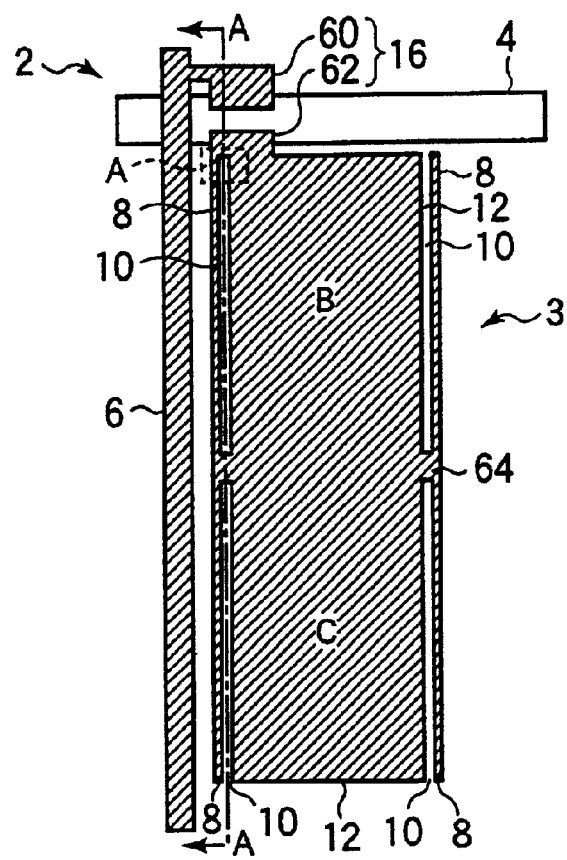
FIG. 5 is a view of an array substrate to show a pixel 2 of an MVA-LCD according to embodiment 1—1 in the first mode for carrying out the invention as viewed in the normal direction of the substrate surfaces.
Figure 6:
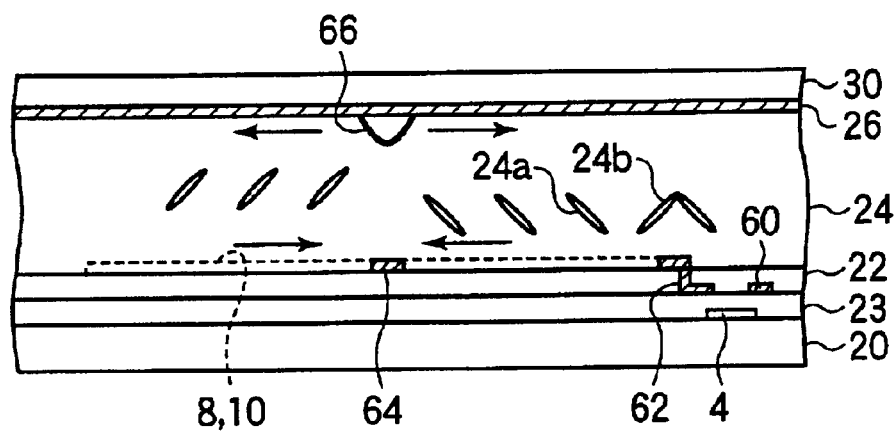
FIG. 6 shows a sectional configuration of the LCD taken along the line A—A in FIG. 5.

Embodiment 1—1 will now be described with reference to FIGS. 5 to 7. FIG. 5 is a view of an array substrate to show a pixel 2 of an MVA-LCD according to the present embodiment as viewed in the normal direction of the substrate surfaces, and FIG. 6 shows a sectional configuration of the LCD taken along the line A—A in FIG. 5. As shown in FIG. 5, a pixel electrode 3 has an internal electrode 12 which is formed with no space 10 and which is an electrode material uniformly formed inside the periphery of the pixel region. Further, the pixel electrode 3 has four spaces 10 which are formed on both sides of the electrode in parallel with a drain bus line 6 and which are formed on both of upper and lower sides of a connection electrode 64 and four stripe-shaped electrodes 8 which is adjacent to the internal electrode 12 with the spaces 10 interposed therebetween. Each of the stripe-shaped electrodes 8 is electrically connected to the internal electrode 12 through the connection electrode 64 which is formed substantially in the middle of the pixel 2 in the vertical direction thereof. An upper left part of the internal electrode 12 is connected to a source electrode 62 of a TFT 16.

In the present embodiment, the stripe-shaped electrodes 8 have a width L which is 3 $\mu$m, and the spaces 10 have a width S which is 3 $\mu$m. The total area of the spaces 10 in the present embodiment occupies 6% of the total area of the pixel electrode 3 that is the sum of the areas of the spaces 10 and the stripe-shaped electrodes 8 and the other electrodes (internal electrode 12 and connection electrode 64).

As shown in FIG. 6, a linear protrusion 66 extending in parallel with a gate bus line 4 is formed on an opposite substrate provided in a position in a face-to-face relationship with the connection electrode 64 in the middle of the pixel region. The aligning direction of liquid crystal molecules 24a can be more strongly determined by the linear protrusion 66.

Instead of providing the linear protrusion 66 on the opposite substrate, a rubbing process may be performed on an alignment film on the array substrate or opposite substrate. In this case, as indicated by the arrow in FIG. 6 both regions B and C of the array substrate shown in FIG. 5 are rubbed toward the center of the pixel electrode 3 in parallel with the drain bus line 6. The opposite substrate is rubbed in the direction of becoming apart from the connection electrode 64. Alternatively, optical alignment method by using UV light may be adopted.

The alignment of liquid crystal molecules 24b in a region A enclosed by a broken line in the vicinity of the TFT 16 shown in FIG. 5 may be disturbed such that the molecules will be tilted in a direction opposite to that of liquid crystal molecules 24a in the region B as shown in FIG. 6. As a result of such an irregularity of alignment, dark parts may be formed in the region A when a voltage is applied to the liquid crystal layer 24. FIG. 7 shows a modification for mitigating this problem. In the modification, two linear protrusions 68 extending in parallel with the gate bus line 4 are formed as alignment regulating structures in the vicinity of both ends of the pixel electrode 3 close to the gate bus line 4, as shown in FIG. 7. By adding the linear protrusions 68 on the gate bus line and between the gate bus line 4 and the pixel electrode 3, the tilting direction of the liquid crystal molecules 24b in the region A can be made equal to that of the liquid crystal molecules 24a in the region B. Cutouts (slits) in the electrode may be used as alignment regulating structures by forming the electrode with partial cutouts.

Figure 7:
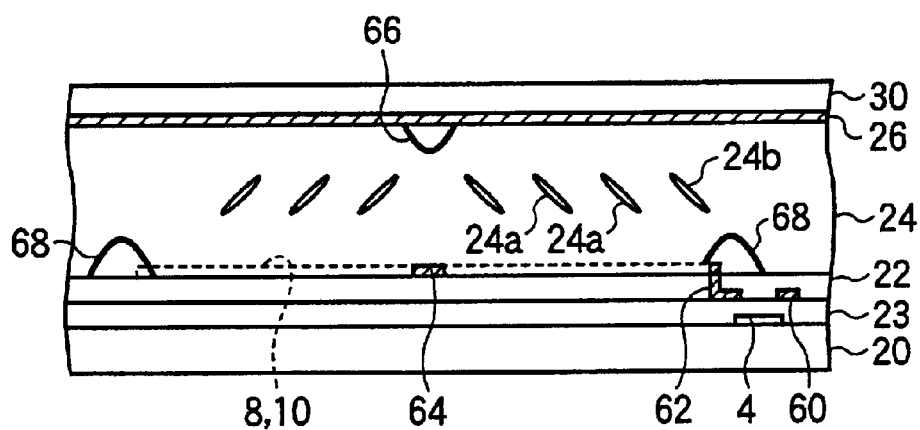
FIG. 7 shows a modification of the MVA-LCD of Embodiment 1—1 in the first mode for carrying out the invention.

A voltage was applied to the liquid crystal layer 24 using the structure of the modification in FIG. 7 (gate electrode was at 30 Vdc; drain electrode was at −5 Vdc; and common electrode was at a ground potential) to tilt the liquid crystal molecules 24a in the pixel 2 in a predetermined direction and, in the same state, the liquid crystal added with a photo-polymeric monomer was irradiated with light to polymerize the monomer, thereby fixing the pre-tilt angle and/or aligning direction of the liquid crystal molecules 24a. The completed MVA-LCD was driven for display, and an observation on the display area indicated that light was transmitted through the entire pixel region and that the LCD had better transmittance compared to conventional LCDs.

As thus described, in the present embodiment, the stripe-shaped electrodes 8 are provided on both of the peripheral regions of the pixel close to the drain bus line 6 when two separate alignments are to be achieved in the direction in which the drain bus line 6 extends, and the spaces 10 occupy 6% of the area. This makes it possible to achieve preferable alignment of the liquid crystal layer 24 and to achieve high transmittance.

[Embodiment 1-2]

Figure 8:
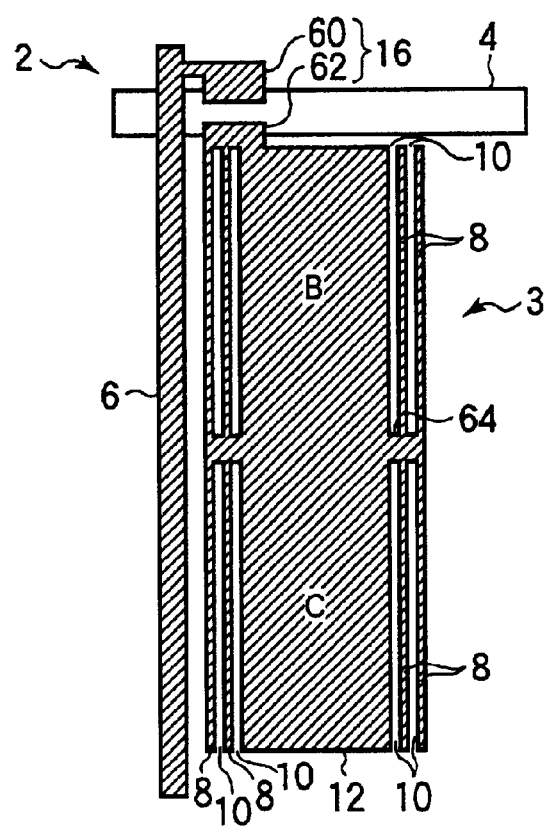
FIG. 8 is a view of an array substrate to show a pixel 2 of an MVA-LCD according to embodiment 1-2 in the first mode for carrying out the invention as viewed in the normal direction of the substrate surfaces.

Embodiment 1-2 will now be described with reference to FIG. 8. FIG. 8 is a view of an array substrate to show a pixel 2 of an MVA-LCD according to the present embodiment as viewed in the normal direction of the substrate surfaces. The present embodiment is identical to Embodiment 1—1 in configuration except for the structure of a pixel electrode 3. The pixel electrode 3 of the present embodiment is different from the structure of the pixel electrode 3 of Embodiment 1—1 shown in FIG. 5 in that it is formed with eight spaces 10 in total, i.e., two each spaces 10 on both sides of the electrode in parallel with a drain bus line 6 and on both of upper and lower sides of a connection electrode 64 and in that it is formed with eight stripe-shaped electrodes 8 in total, i.e., two each electrodes 8 associated with each pairs of spaces 10 adjacent to an internal electrode 12.

Since the total area of the spaces 10 in the present embodiment is twice that in Embodiment 1—1, it occupies 12% of the total area of the pixel electrode 3.

As thus described, a plurality of stripe- shaped electrodes 8 are provided at both of the peripheral regions of the pixel close to the drain bus line 6 also in the present embodiment in order to achieve two separate alignments in the direction in which the drain bus line 6 extends, and the spaces 10 occupy 12% of the total area. This makes it possible to achieve preferable alignment of the liquid layer 24 and to achieve high transmittance.

[Embodiment 1-3]

Figure 9:
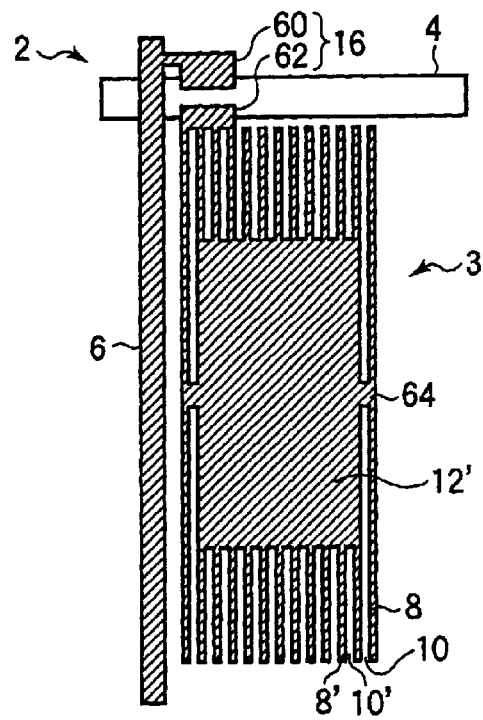
FIG. 9 is a view of an array substrate to show a pixel 2 of an MVA-LCD according to embodiment 1-3 in the first mode for carrying out the invention as viewed in the normal direction of the substrate surfaces.

Embodiment 1-3 will now be described with reference to FIG. 9. FIG. 9 is a view of an array substrate to show a pixel 2 of an MVA-LCD according to the present embodiment as viewed in the normal direction of the substrate surfaces. The present embodiment is identical to Embodiment 1—1 in configuration except for the structure of a pixel electrode 3. Unlike the structure of the pixel electrode 3 of Embodiment 1—1 shown in FIG. 5, the pixel electrode 3 of the present embodiment is characterized in that the height of the internal electrode 12 in FIG. 5 in the extending direction of the drain bus line 6 is reduced to provide an internal electrode 12' and in that stripe-shaped electrodes 8' and spaces 10' in a line-and-space configuration are provided in regions provided by reducing the height of the electrode.

In this structure, the total area of spaces 10 and 10' in the present embodiment occupies 35% of the total area of the pixel electrode 3.

As thus described, a plurality of stripe-shaped electrodes 8 are provided at both of the peripheral regions of the pixel close to the drain bus line 6 also in the present embodiment in order to achieve two separate alignments in the direction in which the drain bus line 6 extends, and the spaces 10 occupy 35% of the total area. This makes it possible to achieve preferable alignment of the liquid layer 24 and to achieve high transmittance.

[Embodiment 1-4]

Figure 10:
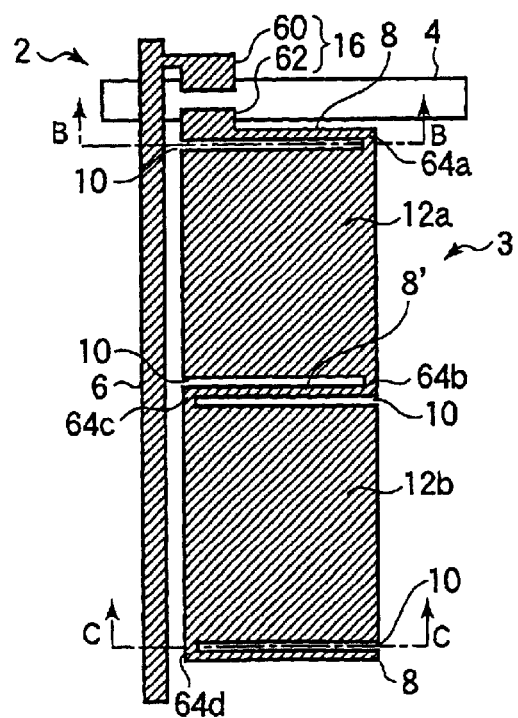
FIG. 10 is a view of an array substrate to show a pixel 2 of an MVA-LCD according to embodiment 1-4 in the first mode for carrying out the invention as viewed in the normal direction of the substrate surfaces.

Embodiment 1-4 will now be described with reference to FIGS. 10 through 13. FIG. 10 is a view of an array substrate to show a pixel 2 of an MVA-LCD according to the present embodiment as viewed in the normal direction of the substrate surfaces. The structure of a pixel electrode 3 according to the present embodiment is characterized in that stripe-shaped electrodes 8 and spaces 10 are formed in parallel with a gate bus line 4. In order to separate alignment into two horizontal directions of FIG. 10, one stripe-shaped electrode 8 in an upper half of the pixel connected to a source electrode 62 of a TFT 16 is connected to an internal electrode 12*a* in the upper part of the figure through a connection electrode 64*a* in an upper right part of the figure with a space 10 interposed therebetween, and one stripe-shaped electrode 8 in a lower half of the pixel is connected to an internal electrode 12*b* in the lower part of the figure by a connection electrode 64*d* in a lower left part of the figure with a space 10 interposed there between. The internal electrode 12*a* is connected to a stripe-shaped electrode 8' accompanied by spaces 10 on both sides thereof through a connection electrode 64*b* located on the right of the same, and the internal electrode 12*b* is connected to the electrode through a connection electrode 64*c* located on the left of the same.

This makes it possible to actively utilize the alignment of liquid crystal molecules that is tilted in a direction orthogonal to the drain bus line 6 by a transverse electric field generated at the ends of the pixel electrode in parallel with the drain bus line 6. Obviously, the positions of the connection electrodes 64*a* through 64*d* maybe reversed to provide a structure of the pixel electrode 3 that is reversed in the horizontal direction in FIG. 10. In this resultant structure, the total area of the spaces 10 in the present embodiment occupies 4% of the total area of the pixel electrode 3.

As thus described, in the present embodiment, in order to achieve two separate alignments in the extending direction of the gate bus line 4, the stripe-shaped electrode 8 is provided at least in the peripheral regions of the pixel close to the gate bus line 4; the stripe-shaped electrode 8' is provided in the vicinity of the boundary for alignment separation (the position where the two internal electrodes 12 and 12' face each other); and the spaces 10 occupy 4% of the total area. This makes it possible to achieve preferable alignment of the liquid crystal layer 24 and to achieve high transmittance.

Figure 11:
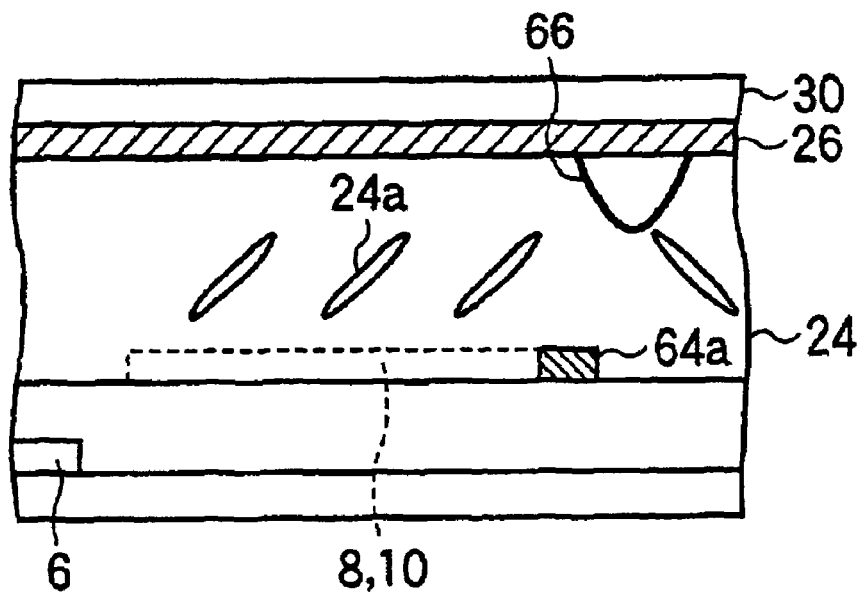
FIG. 11 shows a sectional configuration of the LCD taken along the line B—B in FIG. 10.
Figure 12:
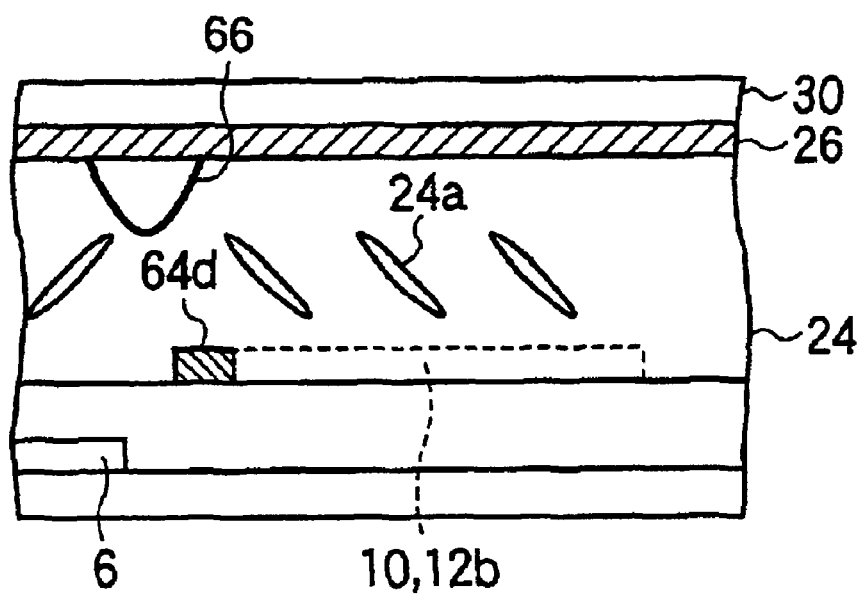
FIG. 12 shows a sectional configuration of the LCD taken along the line C—C in FIG. 10.

FIG. 11 shows a section taken along the line B—B in FIG. 10. FIG. 12 shows a section taken along the line C—C in FIG. 10. As shown in FIGS. 11 and 12, linear protrusions 66 are formed on the opposite substrate between the connection electrodes 64*a* and 64*d* and the drain bus line 6 located adjacent thereto. By forming the linear protrusions 66, it is possible to eliminate the influence of electric fields between edges of the internal electrodes 12 and 12' close to the connection electrodes 64*a* and 64*d* and the drain bus line 6 adjacent thereto. A rubbing process or optical alignment process may be performed to determine the aligning direction more reliably.

FIG. 13 shows a modification of the present embodiment. As shown in FIG. 13, a linear protrusion 68 may be provided on the array substrate in the vicinity of each of the left end of the internal electrode 12 and the right end of the internal electrode 12' in the figure. By forming the linear protrusions 68, it is possible to eliminate the influence of electric fields between the vicinity of the left end of the internal electrode 12 and the right end of the internal electrode 12' in the figure and the drain bus line 6 adjacent thereto.

In this configuration, a voltage is applied to the liquid crystal layer 24 to polymerize a monomer in the liquid crystal layer 24. The MVA-LCD thus completed is substantially free from electric fields generated between edges of pixels when displaying an image because the tilting direction of liquid crystal molecules 24a is determined by the resultant polymer. The MVA-LCD was driven for display, and an observation on the display area indicated that light was transmitted by the entire pixel region and that transmittance could be improved compared to related art LCDs.

[Second Mode for Carrying Out the Invention]

Figure 16:
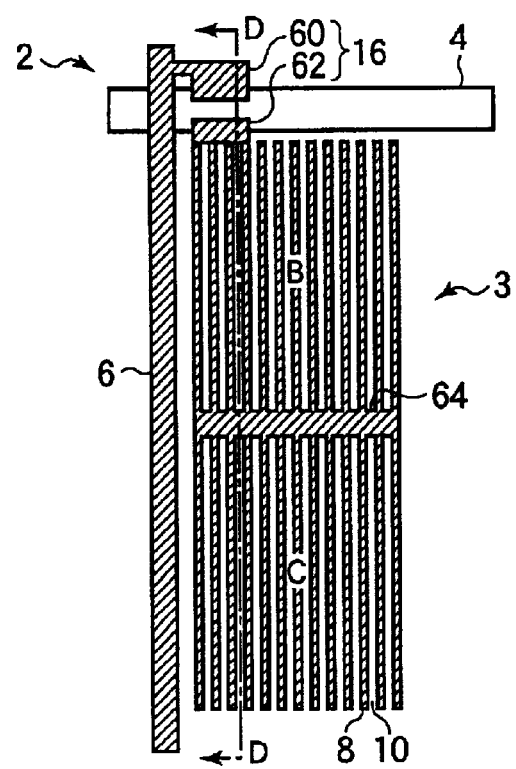
FIG. 16 is a view of a pixel 2 of a previously proposed MVA-LCD in the normal direction of the substrate surfaces.
Figure 17:
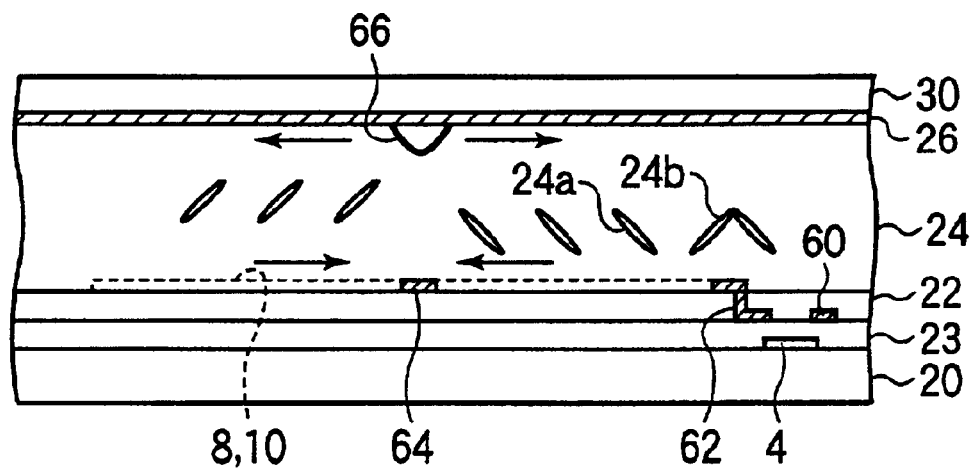
FIG. 17 shows a sectional configuration taken along the line D—D in FIG. 16.
Figure 18:
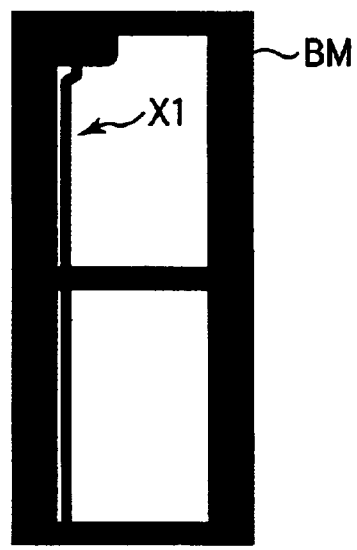
FIG. 18 is a microscopic view of a pixel of conventional MVA-LCD in the normal direction of the substrate surfaces.

A description will now be made with reference to FIGS. 18 through 20B on a substrate for a liquid crystal display in a second mode for carrying out the invention and a liquid crystal display utilizing the same. In the first mode for carrying out the invention, as described with reference to FIG. 5, the a dark line is generated at the boundary between the liquid crystal molecules 24a tilting in the positive direction and the liquid crystal molecules 24b tilting in the opposite direction in the region A enclosed by a broken line that represents a connecting portion between the source electrode 62 of the TFT 16 and the stripe-shaped electrode 8. This phenomenon also occurs in the proposed structure of a pixel electrode shown in FIGS. 16 and 17 (see the liquid crystal molecules 24b in FIG. 17). While the generation of a dark line is prevented by providing the linear protrusion 68 on the array substrate in the first mode for carrying out the invention, a discussion will now be made on a state in which no linear protrusion 68 is provided.

When no linear protrusion 68 is provided, since there is no electric field that determines the position where a dark line is generated, the region of liquid crystal molecules 24b tilting in the opposite direction can have any expanse. Since this results in an action of pulling out liquid crystal molecules 24a' (not shown) tilted in a direction orthogonal to the drain bus line 6 in the vicinity of the bus line from the region of the black matrix toward the display area, a region in which liquid crystal molecules 24a' exist is formed between the periphery of the pixel and the drain bus line 6. As a result, the dark line X1 which has been located in the vicinity of the drain bus line 6 and outside the display area is expanded, and the dark line X1 will appear in the vicinity of the drain bus line 6 inside the display area as shown in a microscopic view of the pixel in FIG. 18.

In the present mode for carrying out the invention, in order to solve the above-described problem, a configuration is employed to eliminate mutual influence between the liquid crystal molecules 24b tilting in the opposite direction in the vicinity of the connecting portion between the source electrode 62 and the stripe-shaped electrode and the liquid crystal molecules 24a tilting in the direction orthogonal to the drain bus line 6 in the vicinity of the drain bus line 6.

Liquid crystal displays in the present mode for carrying out the invention will now be specifically described with reference to embodiments.

[Embodiment 2-1]

Figure 19A:
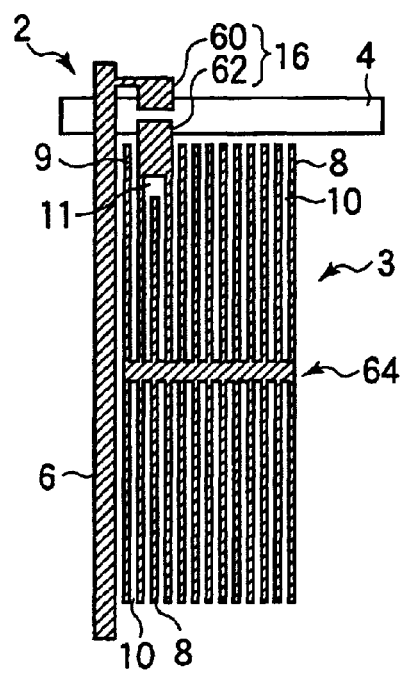
FIGS. 19A and 19B show a pixel 2 of an MVA-LCD having two separately aligned regions according to Embodiment 2-1 in a second mode for carrying out the invention.
Figure 19B:
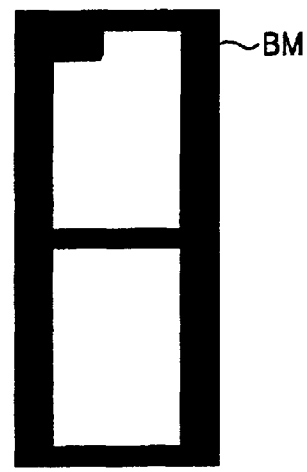

Embodiment2-1 will now be described with reference to FIGS. 19A and 19B. FIG. 19A shows a pixel 2 of an MVA-LCD having two separately aligned regions as viewed in the normal direction of the substrate surfaces. FIG. 19B is a microscopic view of the MVA-LCD taken in the normal direction of the substrate surfaces. As shown in FIG. 19A, in the present embodiment, one each stripe-shaped electrode 9 and space 10 are formed between a drain bus line 6 and a TFT 16.

Further, in order to prevent liquid crystal molecules 24b from tilting in the opposite direction, a stripe-shaped electrode 8 located in the middle of a connecting portion between a source electrode 62 of the TFT 16 and stripe-shaped electrodes 8 is cut near the connecting portion to form a gap 11 between the source electrode 62 and the end of the stripe-shaped electrode 8.

When one or more stripe-shaped electrodes 9 and spaces 10 are formed between the drain bus line 6 and TFT 16, the stripe-shaped electrodes 9 cause liquid crystal molecules 24a in the vicinity of the drain bus line 6 on the pixel electrode 3 to be tilted in a direction in parallel with the longitudinal direction of the spaces 10. This makes it possible to eliminate mutual influence between the alignment of liquid crystal molecules 24a tilting in a direction orthogonal to the drain bus line 6 and liquid crystal molecules 24b tilting in the opposite direction in the vicinity of the source electrode 62 of the TFT 16. As a result, a dark line X1 in the vicinity of the drain bus line 6 can be kept in a black matrix outside the display area.

Further, by cutting at least a part of the stripe-shaped electrode 8 at the connecting portion between the source electrode 62 of the TFT 16 and the pixel electrode 3 to form the gap 11, it is possible to obtain an effect similar to the effect of the formation of a new end of a stripe-shaped electrode 8. This makes it possible to minimize a dark line X1 and to keep the position of the dark line within the black matrix outside the display area.

Since dark lines X1 are frequently generated by bead spacers and the like for maintaining a cell gap between the substrates acting as kernels, it is preferable to provide spacers for maintaining a gap in place of columnar spacers outside the display area.

If the width L of the stripe-shaped electrodes 8 and 9 is too small, the electrodes can be broken. If the width is too wide, the liquid crystal molecules 24a will not be tilted in parallel with the longitudinal direction of the spaces 10. If the width S of the spaces 10 is too small, shorting can occur between the stripe-shaped electrodes 8 and 9. If the width is too wide, the liquid crystal molecules 24a will not be tilted in the longitudinal direction of the spaces 10. It is therefore preferable to set the width L of the stripe-shaped electrodes 8 and 9 and the width S of the spaces 10 in a range between 0.5 $\mu$m and 5 $\mu$m inclusive.

Similarly, the width of the gap 11 (the distance between ends of the source electrode 62 and the stripe-shaped electrode 8 facing each other) is preferably set in a range between 0.5 $\mu$m and 5 $\mu$m inclusive.

In the present and following embodiments, vertical alignment films are used; a liquid crystal has negative dielectric anisotropy; polarizers are in the normally black mode because they are applied on both sides of a liquid crystal panel in a crossed Nicols configuration; and the polarizing axis of the polarizers is at 45 deg. to a bus line. The panel size of 15 inches, and resolution is in accordance with XGA specifications.

[Embodiment 2—2]

Figure 20A:
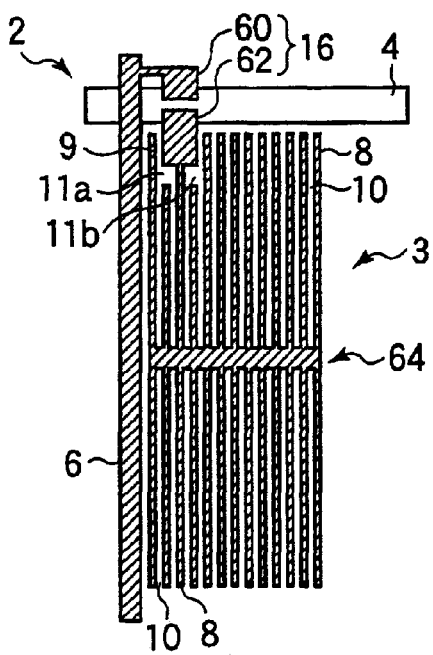
FIGS. 20A and 20B show a pixel 2 of an MVA-LCD having two separately aligned regions according to Embodiment 2—2 in the second mode for carrying out the invention.
Figure 20B:
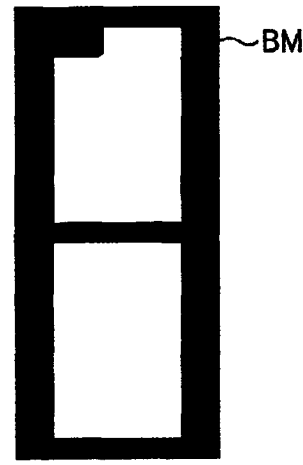

Embodiment 2—2 will now be described with reference to FIGS. 20A and 20B. FIG. 20A shows a pixel 2 of an MVA-LCD having two separately aligned regions as viewed in the normal direction of the substrate surfaces. FIG. 20B is a microscopic view of the MVA-LCD taken in the normal direction of the substrate surfaces. As shown in FIG. 20A, in the present embodiment, one each stripe-shaped electrode 9 and space 10 are formed between a drain bus line 6 and a TFT 16 similarly to Embodiment 2-1.

Further, in order to prevent liquid crystal molecules 24b from tilting in the opposite direction, two stripe-shaped electrodes 8 located on both sides of a connecting portion between a source electrode 62 of the TFT 16 and stripe-shaped electrodes 8 are cut near the connecting portion to form two gaps 11a and 11b between the source electrode 62 and the ends of the stripe-shaped electrodes 8.

In such a configuration, a stripe-shaped electrode 9 also causes liquid crystal molecules 24a in the vicinity of the drain bus line 6 on the pixel electrode 3 to be tilted in a direction in parallel with the longitudinal direction of spaces 10. This makes it possible to eliminate mutual influence between the alignment of liquid crystal molecules 24a tilting in a direction orthogonal to the drain bus line 6 and liquid crystal molecules 24b tilting in the opposite direction in the vicinity of the source electrode 62 of the TFT 16.

Further, since the formation of the gaps 11a and 11b provides an effect similar to that of the formation of two new ends of stripe-shaped electrodes 8, the generation of dark lines X1 can be minimized, and the position of them can be kept within a black matrix outside the display area.

In the present embodiment, columnar spacers for maintaining a cell gap are preferably provided outside the display area similarly to Embodiment 2-1. Further, the width L of the stripe-shaped electrodes 8 and 9 and the width S of the spaces 10 are preferably set in a range between 0.5 µm and 5 µm inclusive. Similarly, the width of each of the gaps 11a and 11b is preferably set in a range between 0.5 µm and 5 µm inclusive.

[Third Mode for Carrying Out the Invention]

Figure 21:
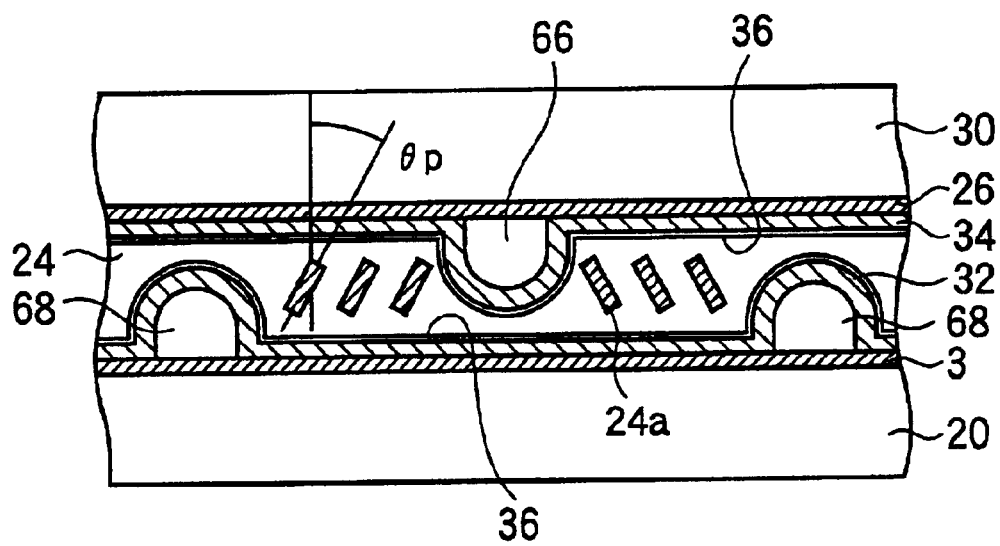
FIG. 21 shows a section of a liquid crystal display in the third mode for carrying out the invention taken in a direction perpendicular to the substrate surfaces.
Figure 22:
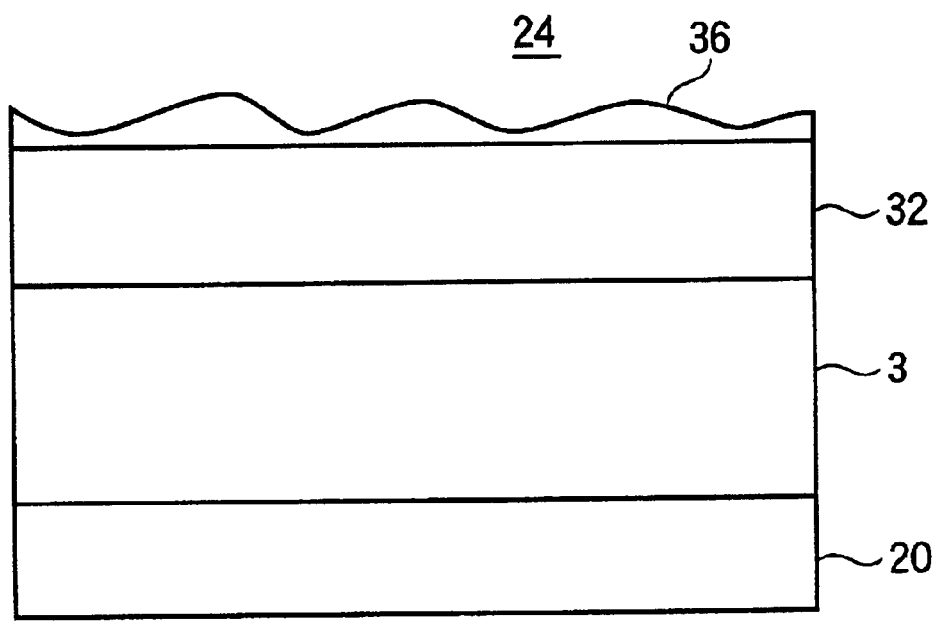
FIG. 22 is a view of an array substrate side of the section of the liquid crystal display in the third mode for carrying out the invention taken in a direction perpendicular to the substrate surfaces.

A description will now be made with reference to FIGS. 21 through 26 on a substrate for a liquid crystal display in a third mode for carrying out the invention and a liquid crystal display utilizing the same. FIG. 21 schematically shows a section of an MVA-LCD in the present mode for carrying out the invention taken in a direction perpendicular to the substrate surfaces. FIGS. 22 through 26 are schematic views showing states of the neighborhood of an alignment film 32. As shown in FIGS. 21 and 22, polymer layers 36 are formed on alignment films 32 and 34 provided on a pixel electrode 3 and a common electrode 26, respectively. As indicated by curves 38 showing changes in an aligning direction in FIG. 23, the alignment of molecules of the polymer in the polymer layers 36 is vertical on the surface of a vertical alignment film and is tilted in a direction at an angle of θp to the vertical on the surface of a liquid crystal.

Thus, the polymer layer 36 determines the aligning direction of liquid crystal molecules 24a in a gap between linear protrusions 66 and 68 which are alignment regulating structures shown in FIG. 21. Specifically, since the aligning direction of the liquid crystal molecules 24a is determined also in the gap between the structures, a response time can be reduced when a halftone is displayed, and transmittance can be improved because irregularities in the alignment of the liquid crystal are reduced.

A liquid crystal display in the present mode for carrying out the invention will now be specifically described by referring to FIGS. 21 through 26 again.

In FIG. 21, a pixel electrode 3 and a common electrode 26 are formed from a transparent material for pixel electrodes such as ITO. Linear protrusions (alignment regulating structures in the form of banks) 66 and 68 having a height of 1.5 µm and a width of 10 µm are formed on the pixel electrode 3 and common electrode 26. The interval between the linear protrusions 66 and 68 is 25 µm. Vertical alignment films 32 and 34 are formed on the pixel electrode 3 and common electrode 26 and on the linear protrusions 66 and 68, respectively. A negative liquid crystal layer 24 having a thickness of about 4 µm is sealed between the vertical alignment films 32 and 34 in a face-to-face relationship. Liquid crystal molecules 24a are tilted in a direction at an angle θp as illustrated. The surfaces of the vertical alignment films 32 and 34 have not been subjected to any process such as a rubbing process or optical aligning process.

Figure 23:
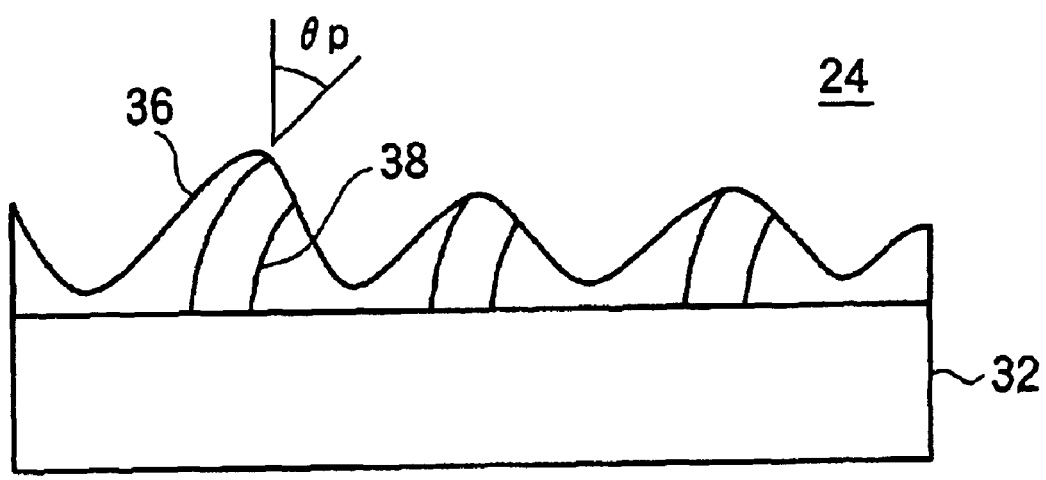
FIG. 23 is another view of the array substrate side of the section of the liquid crystal display in the third mode for carrying out the invention taken in the direction perpendicular to the substrate surfaces.

FIG. 22 shows a polymer layer 36 that is formed on the vertical alignment film 32. Although not shown, a similar polymer layer 36 is also formed on the vertical alignment film 34 on the opposite substrate. FIG. 23 shows a polymer layer 36 that is formed on the surface of the vertical alignment film 32 for pre-tilting the liquid crystal molecules 24a at an angle θp to the liquid crystal layer 24. As apparent from the curves 38 indicating changes in the aligning direction, the polymer in the polymer layer 36 is tilted on the top surface of the layer that is in contact with the liquid crystal layer 24, and the liquid crystal molecules 24a can therefore be pre-tilted in the gap between the linear protrusions 66 and 68. The polymer has a great surface energy because of the presence of irregularities on the surface of the polymer layer 36 as shown in FIG. 23. When the polymer layer has a thickness greater than 5000 Å, since a great voltage drop occurs in the polymer layer 36, the driving voltage becomes impractically high. When the thickness is conversely smaller than 10 Å, a sufficient alignment regulating force can not be obtained.

The polymer layer 36 shown in FIG. 23 is formed by doping a negative liquid crystal with 0.3% monomer by weight along with a polymerization initiator, the monomer having an acryloyl radical and a liquid crystal skeleton, and by polymerizing the monomer using light having an illuminance of 20 mW/cm$^2$ and an energy of 2 J while applying a voltage thereto. An observation using an AFM (atomic force microscope) and a TEM indicated that a polymer layer 36 having a thickness of about 100 Å is formed on the surface of the vertical alignment film 32 when a vertical aligned polyimide film is used as the alignment film 32. As a result of an actual measurement of retardation (Δn d) of the polymer using an ellipsometer, it was found that the polymer was aligned in the aligning direction of the liquid crystal, and a stable alignment of the liquid crystal was observed at a retardation of 0.01 nm or more.

Figure 24:
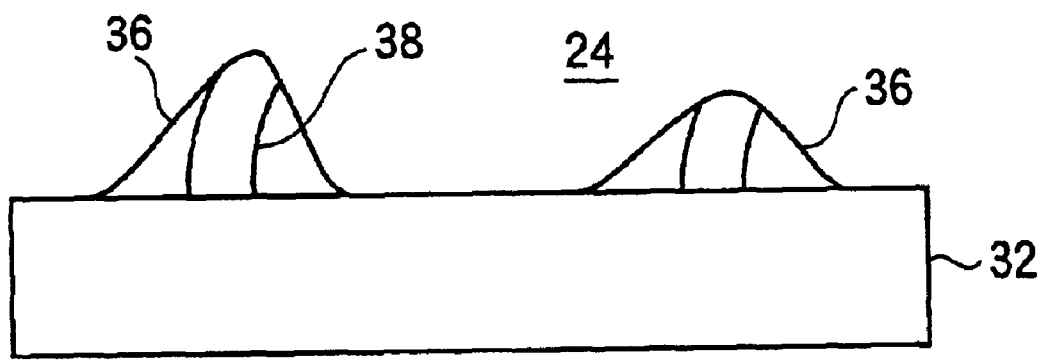
FIG. 24 is still another view of the array substrate side of the section of the liquid crystal display in the third mode for carrying out the invention taken in the direction perpendicular to the substrate surfaces.

FIG. 24 is a schematic view showing a polymer layer 36 that is locally formed. As described above, when a monomer is added in a small dose (about 0.5% or less by weight) or solidified slowly (using a UV light source of about 50 mW or less), a polymer layer can be formed on the entire alignment film or locally formed on the same. Further, the polymer can be aligned in the direction of the liquid crystal by causing polymerization while applying an electric field to provide retardation. A tilted liquid crystal alignment can be achieved by providing such retardation. When a large quantity of monomer is used, a networked polymer may be included.

Figure 25:
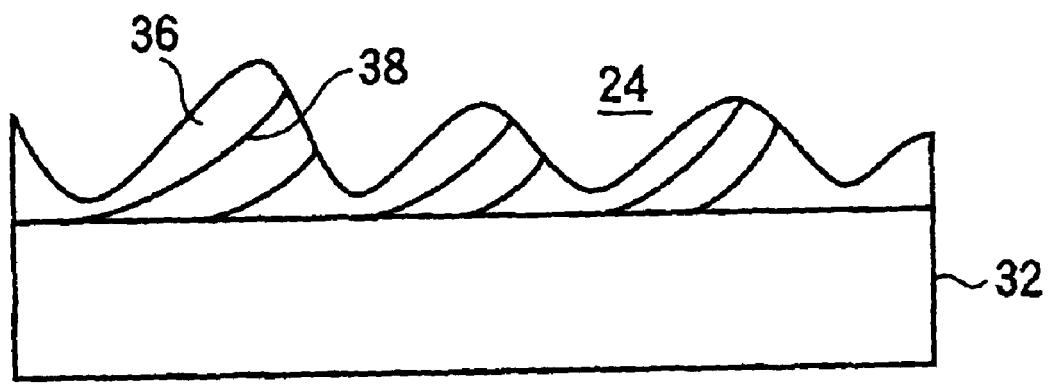
FIG. 25 is still another view of the array substrate side of the section of the liquid crystal display in the third mode for carrying out the invention taken in the direction perpendicular to the substrate surfaces.

FIG. 25 shows a polymer layer 36 that is formed when the alignment films 32 and 34 are horizontal alignment films. The layer is formed by adding a monomer to a positive liquid crystal and polymerizing it while applying a voltage. The layer can be also provided by forming a side chain on the monomer. As indicated by the curves 38 representing changes in an aligning direction in FIG. 25, the alignment of polymer molecules in the polymer layer 36 is horizontal on the surface of the horizontal alignment film 32 and is tilted in a direction at a predetermined angle on the surface of the liquid crystal layer 24. The polymer is pre-tilted to tilt the liquid crystal as a whole uniformly.

Figure 26:
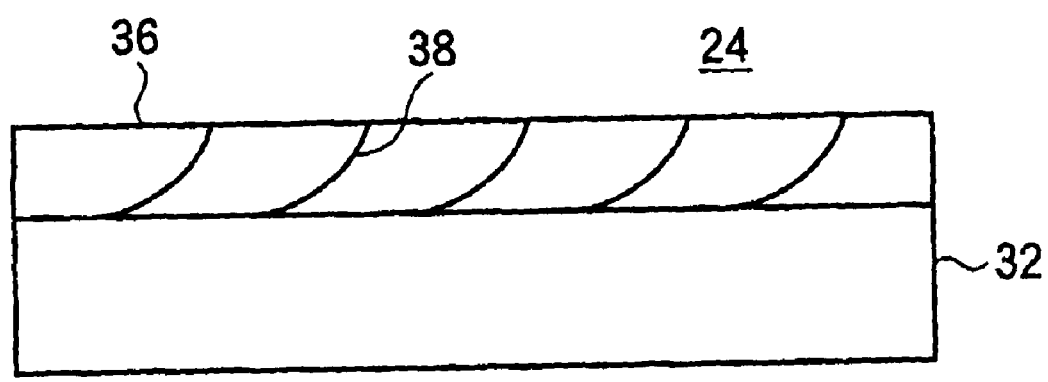
FIG. 26 is still another view of the array substrate side of the section of the liquid crystal display in the third mode for carrying out the invention taken in the direction perpendicular to the substrate surfaces.

FIG. 26 shows a film-like polymer layer 36 that is formed on a horizontal alignment film 3. As indicated by the curves 38 representing changes in an aligning direction, the alignment of polymer molecules in the polymer layer 36 is horizontal on the horizontal alignment film, and the molecules can be made substantially vertical on the surface of the liquid crystal. Such a polymer layer 36 can be also provided by polymerizing a monomer on the horizontal alignment film 32. Alternatively, it can be provided by forming a side chain on a monomer.

While linear protrusions are used as alignment regulating structures in the present mode for carrying out the invention, it is obviously possible to use partition walls, slits, fine slits, rubbed alignment films, and so on. Alternatively, a polymer layer may be formed on a substrate that has vertical or horizontal alignment by itself instead of using an alignment film. A polymer layer in the present mode for carrying out the invention may be used for fixing the alignment of a ferroelectric liquid crystal such as a smectic liquid crystal.

As described above, in the present mode for carrying out the invention, since a polymer layer for defining an aligning direction can be formed between alignment regulating structures that are locally provided, a liquid crystal can be stably aligned on an entire surface of a substrate. This makes it possible to reduce a response time for a halftone and to achieve a high transmittance.

[Fourth Mode for Carrying Out the Invention]

Figure 28:
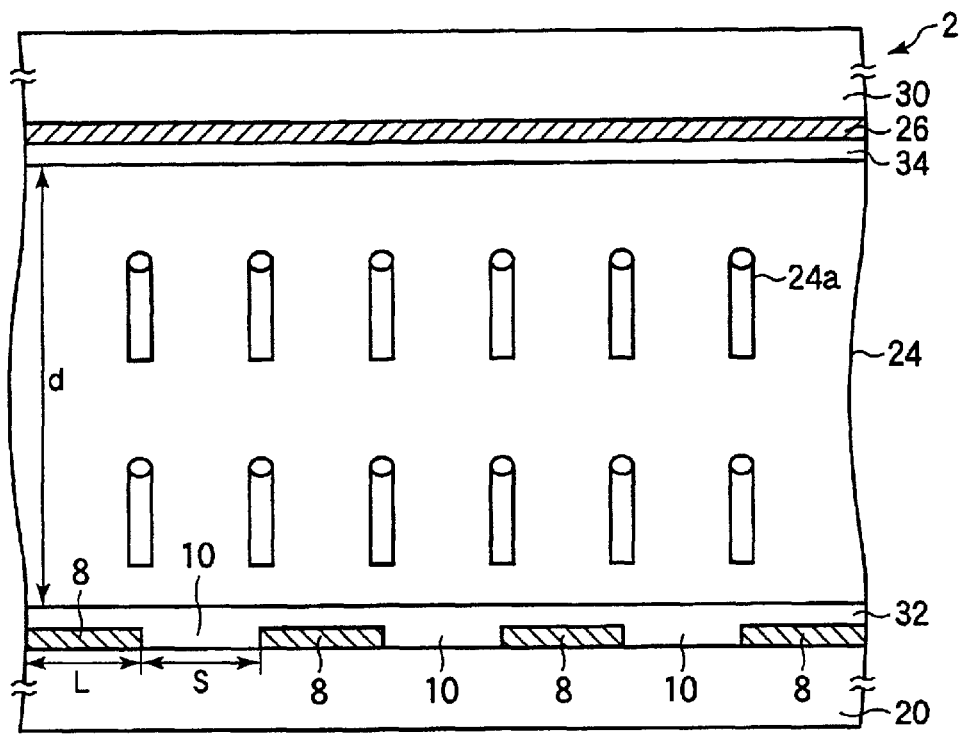
FIG. 28 shows the previously proposed alignment control structures.

A description will now be made with reference to FIGS. 27A through 34 on a substrate for a liquid crystal display in a fourth mode for carrying out the invention and a liquid crystal display utilizing the same. A description will be made on the related art before describing the present mode for carrying out the invention. In a previous application filed by the applicant (Japanese patent application No. 2001-264117 filed on Aug. 31, 2001), it was proposed to provide stripe-shaped electrodes in a line-and-space configuration as a pixel electrode 3 on an array substrate having TFTs 16 formed thereon. FIGS. 27A, 27B, and 28 show alignment regulating structures proposed in the above-cited application. As shown in FIGS. 27A, 27B, and 28, a configuration is proposed in which stripe-shaped electrodes 8 that are a repetition of stripes having a width of a few μm and spaces 10, formed on a substrate, are used to align liquid crystal molecules 24a in parallel with the longitudinal direction of the stripe-shaped electrodes 8 and spaces 10, thereby minimizing the number of boundaries between separate alignments in a pixel.

A problem has been found in this case in that a slight variation in an electrode width L of the stripe-shaped electrodes 8 attributable to a variation in a photolithographic process can result in changes in T-V (transmittance versus applied voltage) characteristics of a liquid crystal display and can appear as irregularities in display. In the above-cited application, a solution to this problem has been proposed in which the electrode width L of the stripe-shaped electrodes 8 is made equal to or wider than a width S of the spaces 10.

Figure 29:
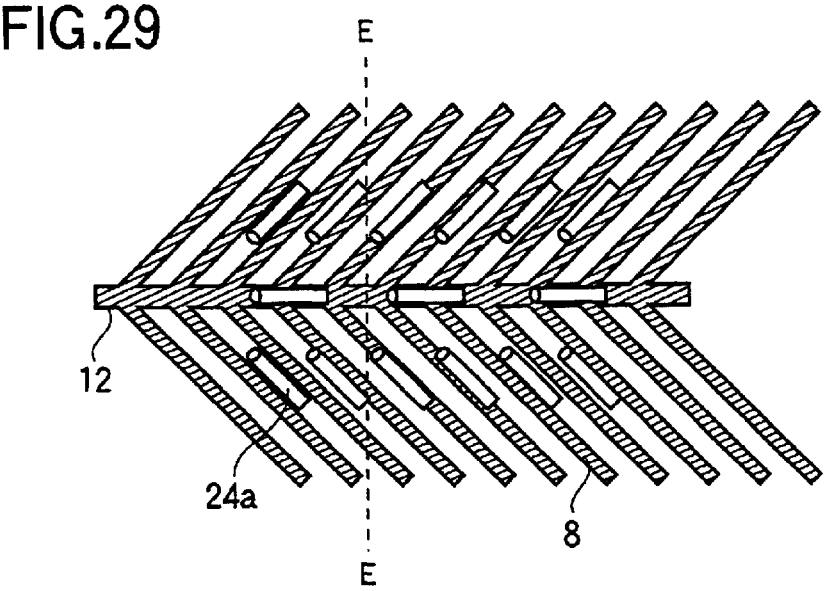
FIG. 29 is a view of a (fish-bone) pattern which is a combination of stripe-shaped electrodes 8 and spaces 10 directed in a plurality of directions as viewed in the normal direction of the substrate surfaces.
Figure 31A:
FIGS. 31A through 31D show a result of an examination carried out on the boundary between the stripe-shaped electrodes 8 and spaces 10 (a back bone section of the fish-bone pattern) to see alignment state between an electrode width L of the stripe-shaped electrodes 8 and a width S of the spaces 10 during display of a halftone.
Figure 31B:
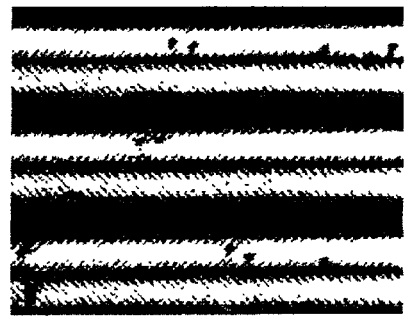
Figure 31C:
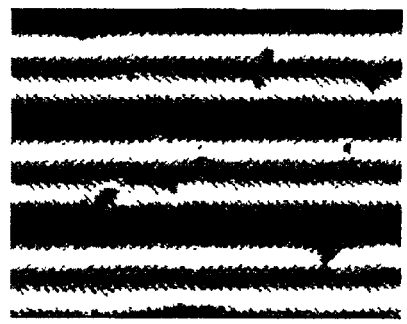
Figure 31D:

In order to control a liquid crystal of a panel utilizing the stripe-shaped electrodes 8 and spaces 10 such that it is aligned in a plurality of directions, for example, it is necessary to use a (fish-bone) pattern which is a combination of stripe-shaped electrodes 8 and spaces 10 directed in a plurality of directions as shown in FIGS. 29 and 30. FIGS. 31A through 31D show a result of an examination carried out on the boundary between the stripe-shaped electrodes 8 and spaces 10 (a back bone section of the fish-bone pattern) to see the relationship between alignment and the electrode width L of the stripe-shaped electrodes 8 and the width S of the spaces 10 during display of a halftone. It was revealed that the alignment at the boundary is more stable when L is narrower than S as shown in FIGS. 31A through 31D. This relationship is the reverse of the relationship between the electrode width L of the stripe-shaped electrodes 8 and the width S of the spaces 10 proposed in the above-cited application. The result was observed before a monomer in the liquid crystals was polymerized, and the problem can be substantially avoided by applying a sufficiently high voltage during polymerization. However, the problem can arise when the polymerizing voltage is low or when alignment is achieved only by the stripe-shaped electrodes 8 and spaces 10 without using the method of fixing through polymerization, and it is preferable to achieve a more stable alignment in both of the region formed by the stripe-shaped electrodes 8 and spaces 10 and the boundary section.

Figure 32:
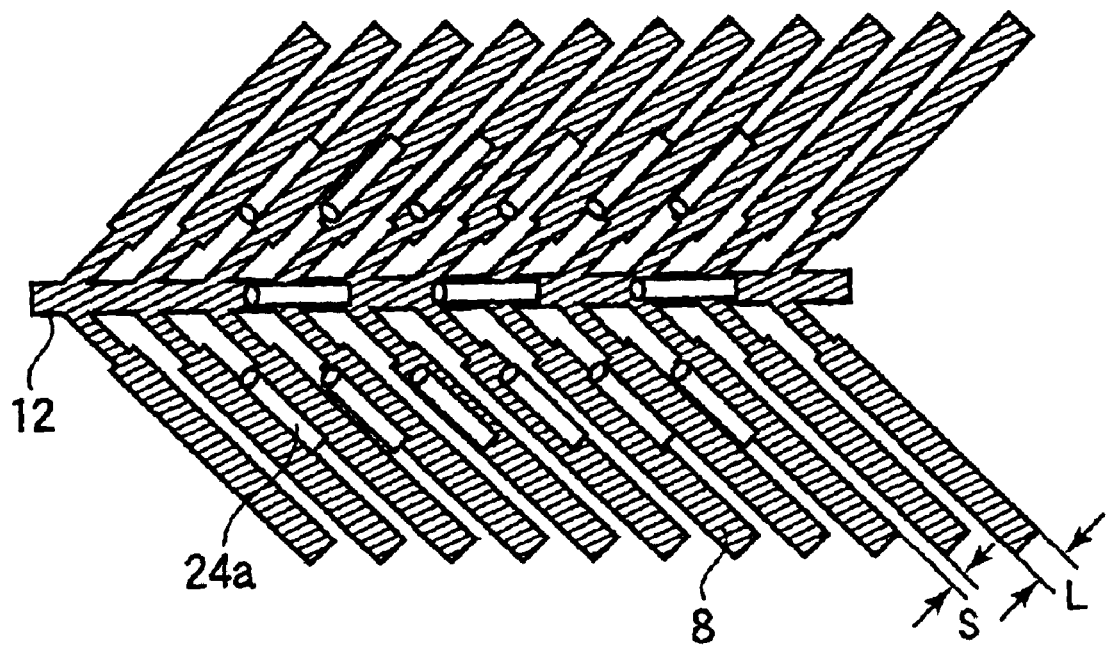
FIG. 32 shows a relationship between an electrode width L of stripe-shaped electrodes 8 of an LCD in a fourth mode for carrying out the invention and a width S of spaces 10 of the same.

A principle of the present mode for carrying out the invention is shown in FIG. 32. As shown in FIG. 32, the stripe-shaped electrodes 8 and spaces 10 have different electrode widths L and space widths S in the vicinity of the boundary (back bone section) and in regions apart from the boundary. Specifically, the electrode width L is narrower than the space width S in the vicinity of the boundary, and the electrode width L is wider than the space width S in the regions apart from the boundary. Since this makes it possible to fix the alignment of a liquid crystal in both of the region in the vicinity of the boundary and the regions apart from the boundary, irregularities in display can be reduced.

A liquid crystal display in the present mode for carrying out the invention will now be specifically described with reference to embodiments.

[Embodiment 4-1]

Figure 33:
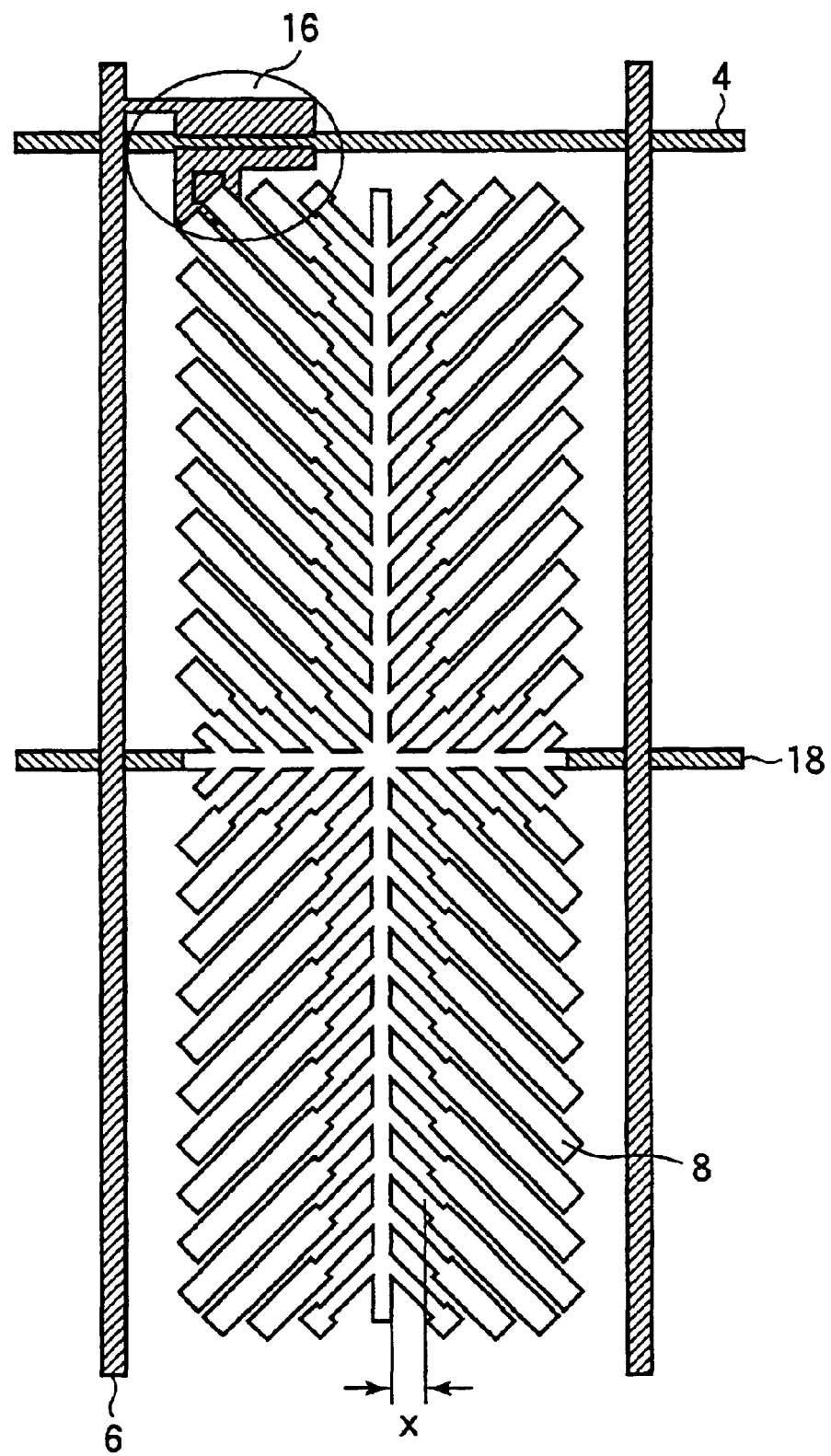
FIG. 33 illustrates Embodiment 4-1 in the fourth mode for carrying out the invention.

Embodiment 4-1 will be described with reference to FIG. 33.

An XGA panel in the 15-inch size (having 1024×768 pixels at a pixel pitch of 297 μm) was fabricated. FIG. 33 shows one pixel of the panel. A TFT 16, a gate bus line 4, a drain bus line 6, and a pixel electrode 3 comprised of stripe-shaped electrodes 8 and spaces 10 were formed on one of the substrates. A color filter layer and a common electrode were formed on the other substrate. Glass substrates OA-2 having a thickness of 0.7 mm (manufactured by Nippon Electric Glass Co., Ltd.) was used as the substrates. The stripe-shaped electrodes 8 were extended in four directions from the center of the pixel (toward the top right, bottom right, top left, and bottom left corner of the pixel).

The electrode width L of the stripe-shaped electrodes 8 and the width S of the spaces 10 were 2 μm and 4 μm respectively in the vicinity of the boundary (back bone) between them, and the electrode width L of the stripe-shaped electrodes 8 and the width S of the spaces 10 were 4 μm and 2 μm respectively in regions apart from the boundary. There was a distance x that was 5 μm between edges of the boundary and positions where the pattern width of the stripe-shaped electrodes 8 changed.

Those substrates were formed with vertical alignment films made of a polyimide material using a printing process and were subjected to a heat treatment for 60 minutes at 180° C. Further, the substrates were combined with spacers having a diameter of 4 μm interposed therebetween to fabricate an open cell having no liquid crystal injected therein. A liquid crystal having negative dielectric anisotropy added with a very small quantity of photo-polymeric monomer was injected into the cell to fabricate a liquid crystal panel. The quantity of the photo-polymeric monomer added was 2.4% by weight. Then, the liquid crystal panel was irradiated with ultraviolet light with a voltage applied thereto to polymerize the monomer. The applied voltage was 10 V, and the dose of ultraviolet light was 2000 mJ/cm$^2$ (λ=365 nm).

[Embodiment 4-2]

Figure 34:
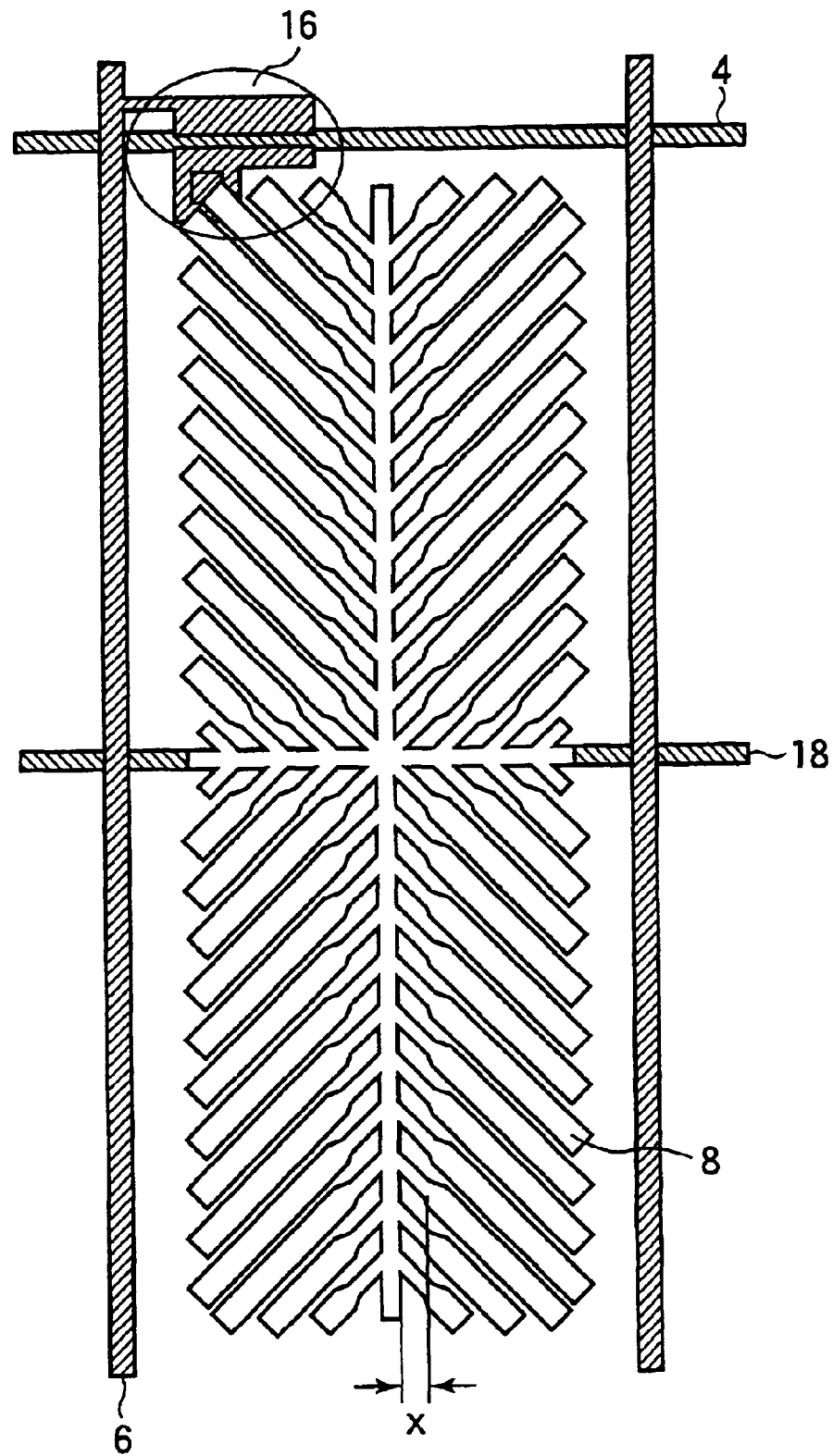
FIG. 34 illustrates Embodiment 4-2 in the fourth mode for carrying out the invention.

Embodiment 4-2 will now be described with reference to FIG. 34. The present embodiment is similar to Embodiment 4-1 except for the following conditions. The electrode width of the stripe-shaped electrodes 8 continuously changed from the width in the vicinity of the boundary to the width in the regions apart therefrom. This also provides an effect similar to that of Embodiment 4-1.

As described above, the present mode for carrying out the invention makes it possible to improve display characteristics of a liquid crystal display in which a pre-tilt angle of liquid crystal molecules and a tilting direction of the same at the application of a voltage are determined using a polymeric material that is thermally or optically polymerized.

[Fifth Mode for Carrying Out the Invention]

A description will now be made on a substrate for a liquid crystal display in a fifth mode for carrying out the invention and a liquid crystal display utilizing the same.

In the case of a polymer-fixing type liquid crystal display in which a liquid crystal layer including a thermally or optically polymeric monomer is sealed between substrates and in which polymeric components are polymerized with a voltage applied to the liquid crystal layer to fix the alignment of the liquid crystal, image sticking can occur which is an after image of a previous image remaining after a change of display when the same image is continuously displayed for a long time. It is an object of the present mode for carrying out the invention to prevent image sticking originating from the polymer-fixing method.

As a result of a close study, it was found that image sticking can be prevented when the molecular weight of the added monomer is substantially equal to or smaller than 1.5 times the average of the molecular weights of the liquid crystal compositions. In particular, it was found that an excellent effect of preventing image sticking can be achieved when the molecular weight of the monomer is substantially equal to or smaller than the average molecular weight of the liquid crystal compositions. It was also found that image sticking can be prevented when the molecular weight of a polymerization initiator is substantially equal to or smaller than the average molecular weight of the liquid crystal compositions. A specific description will follow.

In order to solve image sticking in a polymer-fixing type liquid crystal display, various monomers, polymerization initiators, and liquid crystal compositions were examined, which resulted in the following findings.

Let us assume that $M_{lc}$ represents the molecular weight of liquid crystal compositions; $M_m$ represents the molecular weight of a monomer; and $M_{ini}$ represents the molecular weight of a polymerization initiator.

(i) The rate of image sticking decreases, the smaller the molecular weight $M_m$. In particular, the image sticking ratio is low when the molecular weight $M_m$ is substantially equal to or smaller than the molecular weight $M_{lc}$.

(ii) The image sticking rate is lower, the smaller the molecular weight $M_{ini}$. In particular, the image sticking rate is low when the molecular weight $M_{ini}$ is substantially equal to or smaller than the molecular weight $M_{lc}$.

(iii) A preferable monomer density is in the range from 0.1% to 10% by weight inclusive, from the viewpoint of image sticking. In particular, a density on the order of 0.3% by weight is preferable.

(iv) A polymerization initiator is required to reduce an optimum dose of ultraviolet for improved production efficiency. However, the image sticking rate increases when the density of an initiator is too high. A preferable density of a polymerization initiator is in the range from 0.1% to 10% by weight inclusive. In particular, a density on the order of 2% by weight is preferable.

An image sticking rate is obtained as follows. A black-and-white checker pattern is displayed on a display area of an LCD for a longtime. A predetermined halftone is displayed throughout the display area immediately after displaying the pattern. A difference in luminance is obtained between the regions where white has been displayed and the regions where black has been displayed, and the difference in luminance is divided by the luminance of the regions where black has been displayed to obtain an image sticking rate.

A liquid crystal display in the present mode for carrying out the invention will now be specifically described with reference to embodiments and comparative examples. In all of the following embodiments, vertically alignment films are used; the liquid crystal has negative dielectric anisotropy; the displays are in the normally black mode because the polarizers are applied on both sides of the liquid crystal panel in a crossed Nicols configuration; the polarizing axis of the polarizers is in the direction at an angle of 45 deg. to a bus line; the panel size is 15 inches; and the resolution is in accordance with XGA specifications.

[Embodiment 5-1]

A polymer-fixed LCD was fabricated using a liquid crystal material obtained by mixing a liquid crystal composition having an average molecular weight of about 350 with 0.3% diacrylate monomer by weight, the diacrylate monomer having a molecular weight of about 350. The image sticking rate of the LCD was 5% after display for 48 hours.

COMPARATIVE EXAMPLE 5-1

A polymer-fixed LCD was fabricated using a liquid crystal material obtained by mixing a liquid crystal composition having an average molecular weight of about 350 with 0.3% diacrylate monomer by weight, the diacrylate monomer having a molecular weight of about 700. The image sticking rate of the LCD was 30% after display for 48 hours.

[Embodiment 5-2]

A diacrylate monomer having a molecular weight of about 350 was added with 5% polymerization initiator by weight, the initiator having a molecular weight of about 260. A polymer-fixed LCD was fabricated using a liquid crystal material obtained by mixing a liquid crystal composition having an average molecular weight of about 350 with the diacrylate monomer including the polymerization initiator in a quantity that was 0.3% by weight. The image sticking rate of the LCD was 5% after display for 48 hours. In the present embodiment, the dose of ultraviolet required for achieving a predetermined tilt angle was one-tenth the dose in Embodiment 5-1.

COMPARATIVE EXAMPLE 5-2

A diacrylate monomer having a molecular weight of about 350 was added with 5% polymerization initiator by weight, the initiator having a molecular weight of about 350. A polymer-fixed LCD was fabricated using a liquid crystal material obtained by mixing a liquid crystal composition having an average molecular weight of about 350 with the diacrylate monomer including the polymerization initiator in a quantity that was 0.3% by weight. The image sticking rate of the LCD was 10% after display for 48 hours.

[Embodiment 5-3]

A polymer-fixed type LCD was fabricated using a liquid crystal material obtained by mixing a liquid crystal composition having an average molecular weight of about 350 with 3% diacrylate monomer by weight, the diacrylate monomer having a molecular weight of about 350. The LCD had stable alignment after being annealed for two hours at 120° C.

[Sixth Mode for Carrying Out the Invention]

A liquid crystal display in a sixth mode for carrying out the invention will now be described with reference to FIGS. 35 through 43. Polymer-stabilized liquid crystal panels utilizing an amorphous TN liquid crystal (Japanese patent publication No. 148122/1994) or a ferroelectric liquid crystal (SID '96 Digest, p. 699)have been reported. The related art will now be described with reference to an amorphous TN liquid crystal by way of example. A liquid crystal including a predetermined chiral material is added with a diacrylate resin, and the liquid crystal is injected into a vacant panel. The liquid crystal layer is irradiated with ultraviolet light while applying a voltage thereto, which is effective for both of fixation of defects in the alignment (discreenation) and control over the number of defects attributable to the application of a voltage. This makes it possible to eliminate hysteresis of an amorphous TN liquid crystal and instability of defects in the same which have been encountered in the related art. What is important in achieving fixation using a polymer is to polymerize an optically curing resin in a liquid crystal layer by irradiating the liquid crystal layer with ultraviolet light with a voltage applied to the layer to align liquid crystal molecules in a predetermined direction.

The present mode for carrying out the invention is based on the above-described related art, and it proposes an improvement to allow the related art to be applied to LCDs employing other display methods and structures and provides a technique to allow a further improvement of the reliability of the polymer-fixing method. A specific description will be made with reference to embodiments on the formation of multiple domains in an IPS-LCD (in-plane switching liquid crystal display), an improvement of display characteristics (contrast and so on) of reflection type and trans-reflective type liquid crystal displays, and suppression of image sticking (a displayed pattern that undesirably remains because of a slight change in the alignment of a liquid crystal attributable to energization) as an improvement of the reliability of the polymerizing method.

[Embodiment 6-1]

Figure 35:
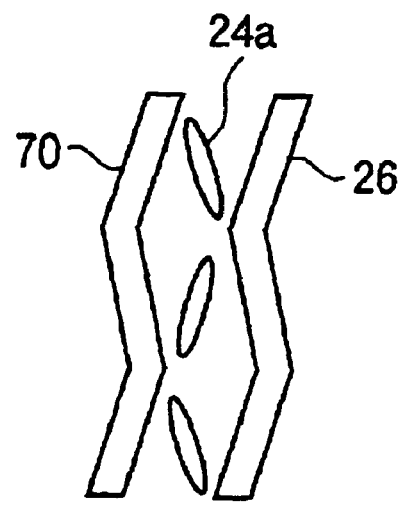
FIG. 35 shows a configuration of a display electrode and a common electrode of a conventional IPS-LCD.

FIG. 35 shows a configuration of a display electrode and a common electrode of a related art IPS-LCD. Similarly to the TN method, a rubbing process is required to implement the IPS method in order to align a liquid crystal horizontally. A horizontal alignment film (e.g., JALS-1054 manufactured by Japan Synthetic Resin Co., Ltd.) is used as an aligning material to provide an initial alignment that has an angle to an electric field, thereby causing a deformation of the alignment easily when a voltage is applied and causing the deformation in a uniform quantity. Although an IPS-LCD is characterized by a wide viewing angle even in a monodomain structure (in which there is one domain having a single alignment in a pixel), it is necessary to form multiple domains in order to provide a wider viewing angle. For this purpose, a technique has been established to provide two domains by forming a display electrode 70 and a common electrode 26 provided in a face-to-face relationship on the same substrate in a chevron structure (V-shaped structure), as shown in FIG. 35. In the same structure, the alignment of liquid crystal molecules 24a is separated to form two domains at an application of a voltage as shown in FIG. 35. However, since the display electrode 70 and common electrode 26 are bent in the plane of the substrate in this structure, there is a further reduction in transmittance.

Figure 36:
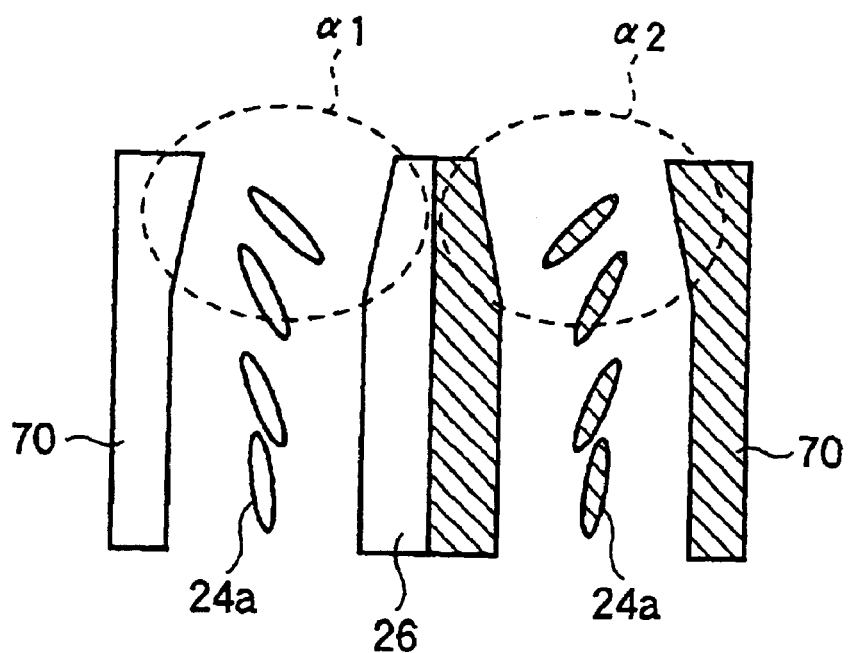
FIG. 36 shows a configuration of a liquid crystal display according to Embodiment 6-1 in a sixth mode for carrying out the invention.

FIG. 36 shows an electrode structure in an IPS-LCD according to the present embodiment. Instead of a chevron structure as shown in FIG. 35, the electrode structure of the present embodiment is a partially tilted electrode structure in which linear display electrodes 70 and a common electrode 26 substantially similar to those in the related art are bent at a predetermined angle in the plane of the substrate at ends thereof as shown in ellipses α1 and α2 in broken lines in FIG. 36. Liquid crystal molecules 24a in the ellipses α1 and α2 are rotated symmetrically about the centerline of the common electrode 26 in the longitudinal direction thereof when a voltage is applied, and the rotation is propagated to other liquid crystal molecules 24a, in the same domain to form two domains. This structure makes it possible to fabricate a stable two-domain panel in combination with the polymer-fixing method. According to the polymer fixation, a monomer is polymerized to form a polymer after the alignment of the liquid crystal enters a steady state. After polymerization, the alignment of the liquid crystal is stable even during a transient response. Although the above description has been based on an assumption that the liquid crystal has positive dielectric anisotropy, it equally applies to negative dielectric anisotropy if the direction of the aligning process is changed by about 90 deg.

[Embodiment 6-2]

Figure 37:
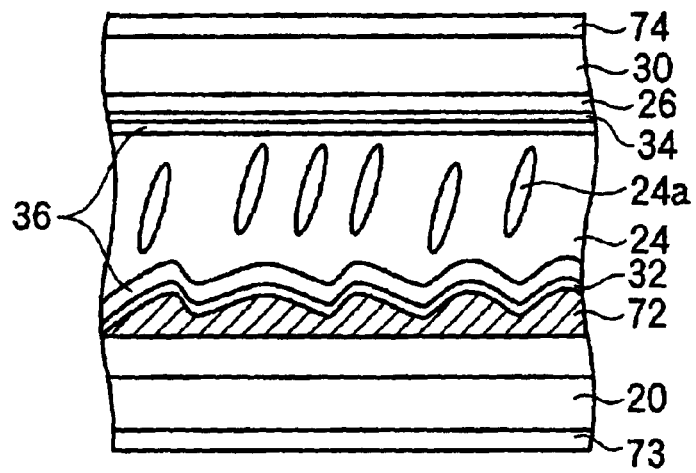
FIG. 37 shows a section of configuration of a liquid crystal display according to Embodiment 6-2 in the sixth mode for carrying out the invention.

FIG. 37 shows a reflection type LCD according to the present embodiment. In the reflection type LCD, a reflection electrode 72 having a concave-convex shapes is used to achieve display quantity close to paper white without parallax. However, the reflection electrode 72 is more likely to result in disturbances to the alignment of a liquid crystal that occur at irregularities acting as kernels when compared to a flat reflection electrode. When a rubbing process is performed, defects in alignment can occur because the alignment process works insufficiently at the bottom of the irregular surface. When the polymerizing technique is in such a state to form a polymer layer 36 on the reflection electrode 72 as shown in FIG. 37, since a desired uniform alignment is achieved and is memorized by the polymer layer 36, it is possible to significantly suppress the occurrence of disordered alignment and the like attributable to disturbances to the alignment which has been frequently observed in the related art.

In FIG. 37, a common electrode 26 is formed from a transparent material for pixel electrodes such as ITO. Alignment films 32 and 34 are formed on the reflection electrode 72 and common electrode 26, respectively. A liquid crystal layer 24 is sealed between the alignment films 32 and 34 in a face-to-face relationship. The polymer layers 36 are formed on the alignment films 32 and 34. The polymer in the polymer layer 36 is tilted on the top surface of the layer that is in contact with the liquid crystal layer 24, and the liquid crystal molecules 24a can therefore be pre-tilted.

[Embodiment 6-3]

Figure 38:
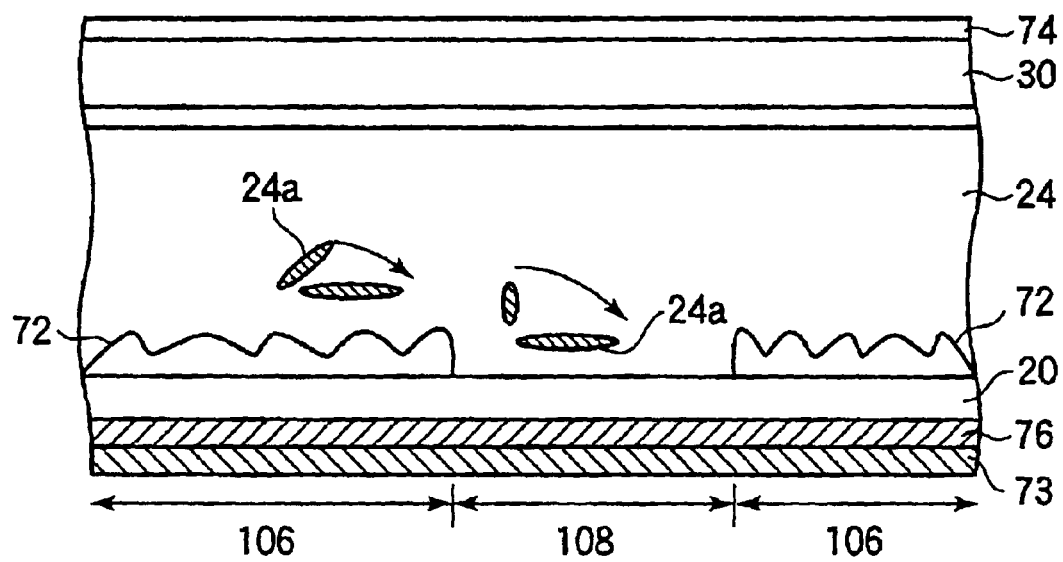
FIG. 38 shows a section of configuration of a liquid crystal display according to Embodiment 6-3 in the sixth mode for carrying out the invention.
Figure 39:
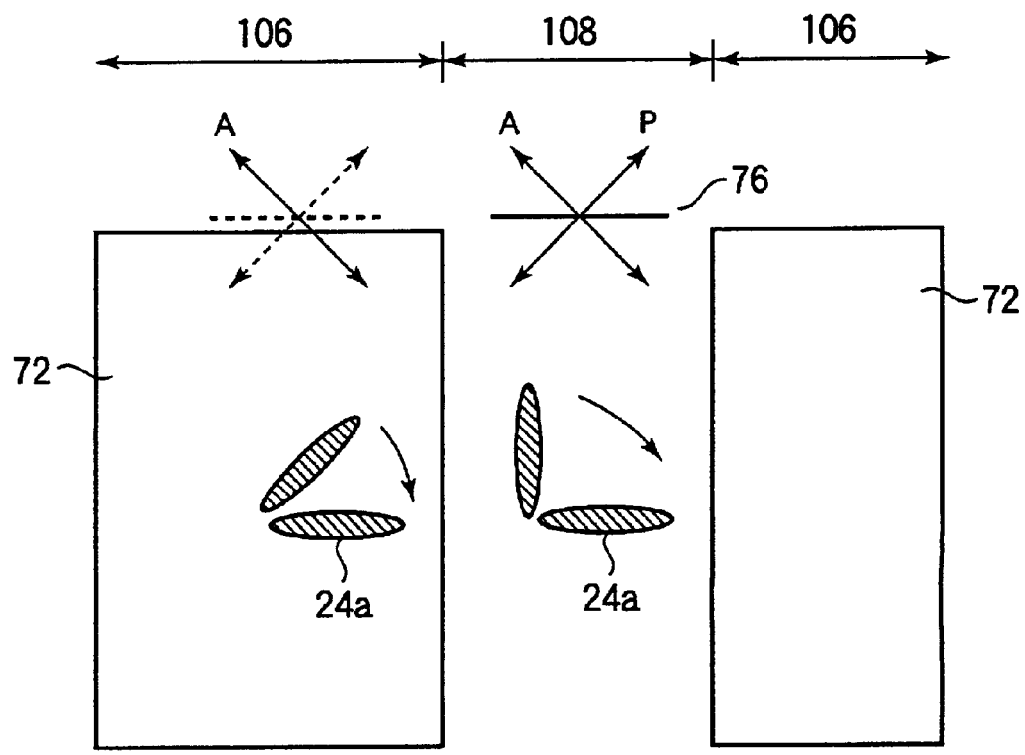
FIG. 39 shows a configuration of the liquid crystal display according to Embodiment 6-3 in the sixth mode for carrying out the invention.

FIGS. 38 and 39 show a trans-reflective type LCD according to the present embodiment. The trans-reflective type LCD has a light-transmitting section and a light-reflecting section to make it possible to achieve preferable display regardless of the brightness of ambient illumination. The trans-reflective type LCD must be switched such that the quantity of a change in retardation at the light-transmitting section attributable to the rotation (switching) of liquid crystal molecules becomes $\lambda/2$ and such that the quantity of a change in retardation of the liquid crystal layer at the light-reflecting section becomes $\lambda/4$ because light travels through the same both ways.

Although there is a technique for changing the thickness of a liquid crystal cell partially (a multi-gap structure) in order to achieve this, the technique is not preferred because it makes manufacturing steps complicated. A possible solution to this is the use of the polymer-fixing method. The polymer-fixing method is characterized in that it makes it possible to fix a particular state of alignment as an initial alignment. The use of this technique makes it possible to provide different quantities of change in retardation at the light-transmitting section and light-reflecting section during switching, thereby allowing the use of a panel having a constant cell thickness.

FIG. 38 is sectional view of a horizontal alignment type LCD according to the present embodiment taken in a direction perpendicular to the substrate surfaces. FIG. 39 shows a state of the same in the position corresponding to FIG. 38 as viewed in the normal direction of the substrate. As shown in FIGS. 38 and 39, a glass substrate 20 on an array substrate and a glass substrate 30 on an opposite substrate are provided in a face-to-face relationship to seal a liquid crystal layer 24. The refection electrodes 72 having concave-convex shapes are locally formed on the glass substrate 20 on the array substrate. The regions where the reflection electrodes 72 having concave-convex shapes are formed serve as light-reflecting sections 106, and the regions where no reflection electrode 72 is formed serve as light-transmitting sections 108. A $\lambda/4$ plate 76 is attached to the surface of the glass substrate 20 opposite to the surface thereof where the reflection electrodes 72 are formed between the polarizer 73 and the glass substrate 20, and a polarizer 73 is attached on the same. A polarizer 74 provided in a crossed-Nicols relationship with the polarizer 73 is attached to the surface of the glass substrate 30 opposite to the liquid crystal layer 24. Although not shown, alignment films are formed on interfaces between the substrates 20 and 30 and the liquid crystal layer 24.

A description will now be made on steps for a trans-reflective type LCD of the present embodiment using a polymer. In a panel having the pixel electrode structure shown in FIGS. 38 and 39, liquid crystal molecules 24a in the light-transmitting section 108 and light-reflecting section 106 are horizontally aligned at a slight angle to the direction in which the reflection electrodes 72 extend (in the vertical direction of FIG. 39). The liquid crystal molecules 24a have positive dielectric anisotropy $\Delta\in$. When a voltage is applied between the reflection electrodes 72, a switching operation occurs in which the liquid crystal molecules 24a in the gaps between the electrodes (light-transmitting sections 108) are rotated at substantially 90 deg. in the horizontal direction (direction in parallel with the substrate surfaces). At this time, the retardation substantially changes from $(-\lambda/4)$ to $\lambda/4$.

The initial alignment is fixed by irradiating the liquid crystal layer 24 with ultraviolet light from the side of the glass substrate 20 on the array substrate with no voltage applied to the liquid crystal layer 24. During this process, monomers in the light-transmitting sections 108 will be primarily consumed for forming polymers on the interfaces of the substrates, and monomers in the light-reflecting sections 106 that are shielded from light using the reflection electrodes 72 remain. Next, the liquid crystal layer 24 is irradiated with ultraviolet light from the side of the glass substrate 30 on the opposite substrate with a voltage applied to the same. Referring to the voltage applied, an appropriate condition is selected to maximize the efficiency of switching of the light-reflecting sections 106. In this case, while polymerization sufficiently proceeds at the interfaces in the light-reflecting sections 106 because of the presence of a great number of unreacted monomers, there is a shortage of monomers in the light-transmitting sections 108. Therefore, the alignment of the liquid crystal in the light-transmitting sections 108 substantially remains unchanged from that after the first stage of irradiation with ultraviolet light, and switching occurs in which the retardation finally changes in a quantity substantially equal to $\lambda/2$ or a 90 deg. rotation of the $\lambda/4$ plate. On the other hand, the direction of the liquid crystal molecules 24a in the light-reflecting sections 106 in its initial state of alignment can be rotated 45 deg. to the liquid crystal molecules 24a in the light-transmitting sections 108 because they are fixed using polymers by applying an optimum voltage. This makes it possible to switch the liquid crystal molecules 24a in the light-reflecting sections 106 with a retardation change of substantially equal to a 45 deg. rotation of the $\lambda/4$ plate. As thus described, the trans-reflective type display can be efficiently switched without providing a multi-gap structure in the pixels by changing the optical switching capabilities of the light-reflecting sections 106 and light-transmitting sections 108 (the quantities of retardation changes when switching the liquid crystal).

It will be easily understood that the same effect can be achieved by combining the above-described embodiment with a liquid crystal having negative dielectric anisotropy and horizontal alignment. In this case, the direction of an initial aligning process will be 90 deg. different from that in the above embodiment and will be substantially perpendicular to the direction in which electrodes extend. Further, unlike the above-described embodiment in which the reflection electrodes 72 are used for light shielding, different conditions for polymer fixation may be applied to each region of the display using light-shields such as photo-masks to provide the liquid crystal in each region with a different switching capability.

[Embodiment 6-4]

Figure 40:
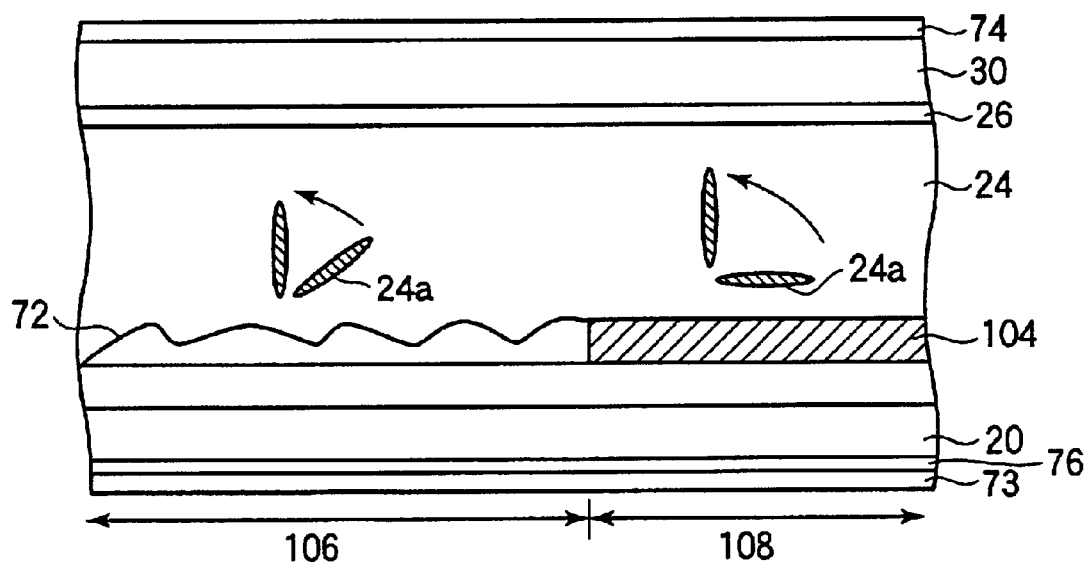
FIG. 40 shows a section of configuration of a liquid crystal display according to Embodiment 6-4 in the sixth mode for carrying out the invention.
Figure 41:
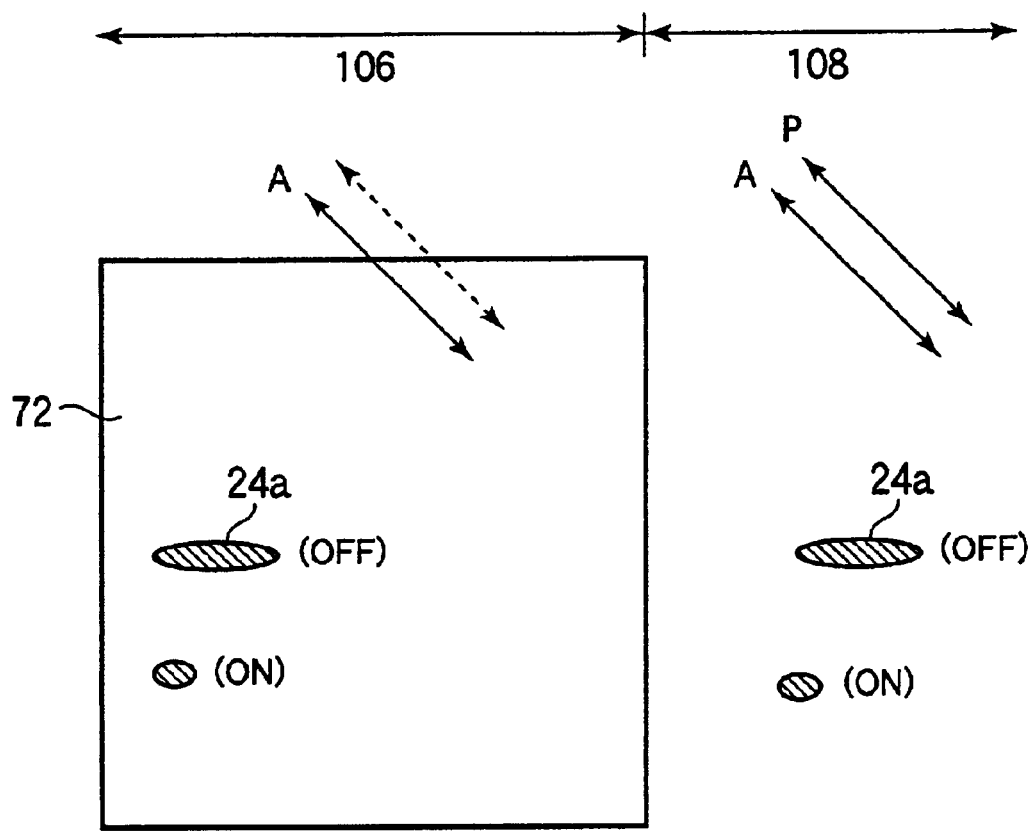
FIG. 41 shows a configuration of the liquid crystal display according to Embodiment 6-4 in the sixth mode for carrying out the invention.

FIG. 40 shows a section of a horizontal alignment type trans-reflective LCD according to Embodiment 6-4 taken in a direction perpendicular to the substrate surfaces. FIG. 41 is a state of the same in a position corresponding to FIG. 40 as viewed in the normal direction of the substrate surfaces. As shown in FIGS. 40 and 41, a glass substrate 20 on an array substrate and a glass substrate 30 on an opposite substrate are provided in a face-to-face relationship to seal a liquid crystal layer 24 having positive dielectric anisotropy. The refection electrodes 72 having concave-convex shapes are locally formed on the glass substrate 20 on the array substrate, and transparent electrodes 104 are formed in the regions where no reflecting electrode 72 is formed. The regions where the reflection electrodes 72 are formed serve as light-reflecting sections 106, and the regions where transparent electrode 104 is formed serve as light-transmitting sections 108. The $\lambda/4$ plate 76 and a polarizer 73 are attached in this order to the surface of the glass substrate 20 opposite to the surface on which the reflecting electrodes 72 are formed. A common electrode 26 is formed on the side of the glass substrate 30 where the liquid crystal layer 24 exists. A polarizer 74 in a parallel Nicols relationship with the polarizer 73 is attached to the surface of the glass substrate 30 opposite to the liquid crystal layer 24. Although not shown, alignment films are formed at the interfaces between the substrates 20 and 30 and the liquid crystal layer 24.

The steps for polymer fixation are the same as those in Embodiment 6-3. In the light-transmitting sections 108, liquid crystal molecules 24a that have been horizontally aligned on the substrate surface stand up substantially vertically to the substrate surface when a voltage is applied. At this time, the retardation changes from $\lambda/2$ to 0 (if a sufficient voltage is applied), resulting in efficient switching in the transmitting mode. On the contrary, liquid crystal molecules 24a in the light-reflecting sections 106 have an initial pre-tilt angle of about 45 deg. and, therefore, they have a retardation of substantially $\lambda/4$ that is one-half that in the light-transmitting sections 108 when viewed at front ways. Therefore, a retardation change from $\lambda/4$ to 0 can occur, which results in efficient switching in the reflecting mode.

Thus, efficient switching can take place in both of the light-transmitting sections 108 and light-reflecting sections 106. The polymer-fixing technique is used to make a proper correction of retardation in parts of the light-transmitting sections 108 or light-reflecting sections 106 in a way suitable for transmission or reflection. By carrying out polymer fixation with a voltage applied, a retardation change at the time of switching can be made small. Similarly to Embodiment 6-3, some of the conditions for polymer fixation can be changed by applying or removing the voltage or by using photo-masks or the like.

[Embodiment 6-5]

A description will now be made on embodiments for preventing image sticking attributable to a pre-tilt that is provided using the polymer-fixing technique. As a result of the inventors' study and examination, it was revealed that some image sticking phenomena resulting from the polymer-fixing technique are caused by a variation of a pre-tilt angle attributable to insufficient polymerization of a monomer unlike image sticking for electrical reasons that are normally observed. Therefore, further improvements in the polymer fixation technique are demanded for stronger and more stable control of alignment.

First, an example will be described in which the conventional polymer fixation technique is used for a vertical alignment type panel, particularly, an MVA-LCD. In the MVA-LCD, as well-known in the art, insulating structures or slits (which were obtained by patterning and removing parts of pixel electrodes) were formed on the TFT substrate and, in association with the same, insulating structures or slits (which were obtained by patterning and removing parts of a common electrode) were formed on the opposite substrate. Vertical alignment films were applied and formed on both of the substrates. This is a polyamic acid type alignment film.

A negative liquid crystal having negative dielectric anisotropy $\Delta\epsilon$, e.g., a material manufactured by Merck KGaA ($\Delta\epsilon$:−3.8, NI-point: 70 deg.) was injected into a vacant panel formed by combining the substrates. A functional monomer, an optical initiator, and the like for polymer fixation were mixed in the negative liquid crystal in a ratio of a few % or less. The density of the functional monomer is its ratio to the liquid crystal base. The density of the optical initiator is its ratio to the monomer. Both of monomers having a liquid-crystalline skeleton and non-liquid-crystalline monomers may be used. Basically, any material that forms a nematic phase when mixed in a nematic liquid crystal may be used. A liquid crystal monoacrylate monomer (ULC-001-K1) manufactured by Dainippon Ink K. K. was used this time as a typical material. A cell was fabricated by irradiating the panel with ultraviolet light (from a high pressure mercury lamp) of 4 J/cm² while applying a voltage of 5 V.

Polarizers were applied to the cell thus obtained, and T-V characteristics of the same were examined before and after a drive test which was carried out by applying a voltage of 5 Vac for 24 hours to see a change in the characteristics. Initial T-V characteristics (before the drive test) and the TV characteristic after the drive test were compared, and a change in transmittance in a steep region of the T-V curve was represented in percentage. The same experiment was carried out on monomers having two or more functional groups and having the same fundamental structures and skeletons. Table 1 shows result of the experiments.

TABLE 1

| Material | Change in Transmittance |
|---|---|
| Monoacrylate | 15% |
| Diacrylate | 6% |
| Triacrylate | 5% |

As apparent from Table 1, it was found that the use of a multi-functional monomer provides a preferable result. A possible reason is the fact that the multi-functionality provides a polymer thus formed with some bridge structure. Table 2 shows a result of a similar experiment carried out by adding a bridging material.

TABLE 2

| Material | Change in Transmittance |
|---|---|
| Monoacrylate | 15% |
| Monoacrylate with Bridging Material | 7% |

While the above description has referred to acrylate monomers, the description equally applies to other monomers, e.g., styrene type, metacrylate type, and acrylonitrile type conjugate monomers and ethylene type, vinyl acetate type, vinyl chloride type, and other types of non-conjugate monomers.

Figure 42:
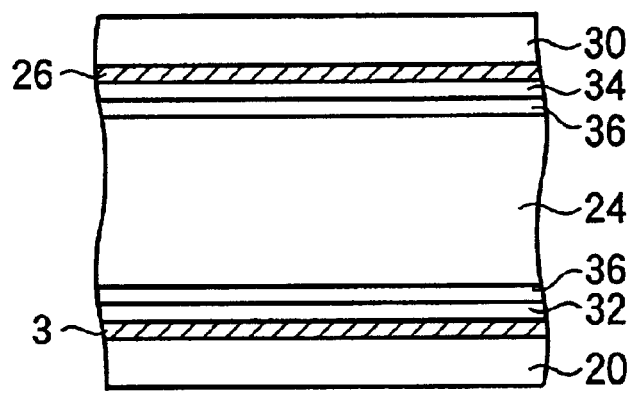
FIG. 42 shows a section of configuration of a liquid crystal display according to Embodiment 6-5 in the sixth mode for carrying out the invention.
Figure 43:
FIG. 43 schematically shows a structure of a copolymer.

It is considered that a bridge structure plays an important role also in providing a so-called copolymer (copolymerized polymer) by mixing different monomers. For example, it is considered effective in mitigating problems of each monomer in various characteristics such as solubility to a host liquid crystal, electrical characteristics, and stability against image sticking or the like. FIG. 42 shows a section of an LCD according to the present embodiment taken in a direction perpendicular to the substrate surfaces. As shown in FIG. 42, a liquid crystal layer 24 includes copolymer layers 37 having a bridge structure in the vicinity of substrates 20 and 30. FIG. 43 schematically shows one of the structures of the copolymers. As shown in FIG. 43, the copolymer has a structure in which two kinds of repeating units (CRU) A and B are alternately arranged, for example.

Further, while the above description has referred to functional monomers, polymer fixation can obviously be performed using a mixture of an oligomer and a monomer. In this case, the oligomer may be a polyester acrylate, a polyurethane acrylate, an epoxy acrylate, a polyether acrylate, an oligoacrylate, an alkyd acrylate, a polyol acrylate, or the like. A polymerization degree of 10 or less will be preferred because it will provides sufficient solubility.

In summary, the present mode for carrying out the invention makes it possible to improve an IPS-LCD by providing it with a uniform and stable alignment in that polymer fixation is carried out after making the alignment of the liquid crystal stable and uniform by applying a voltage for a sufficient time to the liquid crystal panel having a structure in which the alignment of the liquid crystal is otherwise likely to become unstable.

In the case of a reflection type LCD, when reflection electrodes 72 having concave-convex shapes are formed, there is an effect of preventing surface irregularities from adversely affecting the alignment of the liquid crystal.

When evaluated as a basic technique for polymer fixation for improving reliability, the present mode for carrying out the invention is characterized in that a polymeric element is provided with a bridge structure to form a stable polymer on an interface of a substrate and in that a copolymer is provided.

As described above, in the present mode for carrying out the invention, it is possible to make the alignment of a liquid crystal uniform and stable in a panel in which the alignment of the liquid crystal is otherwise unstable. The present mode for carrying out also makes it possible to improve the reliability of a polymer-fixed liquid crystal panel and, in particular, to reduce image sticking significantly.

[Seventh Mode for Carrying Out the Invention]

A liquid crystal display in a seventh mode for carrying out the invention will now be described with reference to FIGS. 44A through 47B. The present mode for carrying out the invention relates to liquid crystal displays in which stripe-shaped electrodes provided on a surface of a substrate are used to provide the switching of liquid crystal molecules with operating components in a direction at an azimuth angle.

TN mode liquid crystal displays have been widely used as active matrix type liquid crystal displays in which a liquid crystal material having positive dielectric anisotropy is aligned in parallel with the substrate surfaces and at a twist of 90 deg. between the substrates in a face-to-face relationship. However, TN mode liquid crystal displays have a problem in that they have poor viewing angle characteristics. Under such circumstances, various studies are being made in order to improve viewing angle characteristics.

Methods proposed as alternatives to the TN mode include the IPS (in-plane switching) mode in which driving is performed by applying an electric field in the direction of a substrate surface (horizontal direction). Modes for switching in the direction at an azimuth angle represented by the IPS mode are very much better than modes for switching in a direction at a polar angle represented by the TN mode in terms of the viewing angle.

During such switching in the direction at an azimuth angle, it is important to prevent the azimuth angle of a director in a dark state from shifting from an initial state of alignment as a result of driving of liquid crystal molecules. However, even when the alignment is controlled using a rubbing process, the aligning direction is subjected to a time-dependent shift relative to the azimuth angle as driving proceeds in case of decreasing rubbing strength, which results in a problem in that a reduction in contrast occurs. In the case of alignment control on a non-contact basis such as irradiation with ultraviolet light which can only provide anchoring strength (an alignment regulating force) smaller than that available with alignment control using a rubbing process, the problem of a shift of the aligning direction becomes more serious.

It is an object of the present mode for carrying out the invention to suppress any time-dependent shift in the alignment of a liquid crystal as a result of driving in a liquid crystal display in which the switching of the liquid crystal includes factors in the direction at an azimuth angle, thereby providing a high quality liquid crystal display.

In the case of liquid crystal displays in which the switching direction of the liquid crystal includes factors in the direction at an azimuth angle represented by IPS mode displays which are dominated by components in the direction at an azimuth angle, it is required to prevent the aligning direction from changing from an initial state as a result of driving when the voltage is off (when a voltage below a threshold voltage is being applied) in order to prevent contrast from being reduced as time passed. However, no specific approach for the object of preventing a shift in alignment has been proposed other than increasing rubbing strength.

As a result of close studies, it has been found that the object can be achieved by causing reaction and formation of an optically curing element which is substantially aligned in an alignment regulating direction in the direction at an azimuth angle of an alignment film (alignment control layer). FIGS. 44A and 44B show the principle of the present mode for carrying out the invention. FIG. 44A shows a state of a conventional liquid crystal display in which a time-dependent shift has occurred in the alignment of the liquid crystal as a result of driving, and FIG. 44B shows a state of a liquid crystal display in the present mode for carrying out the invention in which a time-dependent shift in the alignment of the liquid crystal as a result of driving is prevented. As shown in FIG. 44B, in the liquid crystal display in the present mode for carrying out the invention, an optically setting composition included in the liquid crystal reacts and sets with liquid crystal molecules 24 aligned in the alignment regulating direction of alignment films. The optically setting composition has a force to maintain the liquid crystal molecules 24 in the state of alignment at the time when it sets. Therefore, the optically setting composition regulates the alignment of the liquid crystal molecules 24 as indicated by the arrow 101 in FIG. 44B in addition to the regulation on the alignment provided by the alignment films as shown in FIG. 44B, which significantly mitigates the problem of a time-dependent shift in alignment as a result of driving.

The optically setting composition may be set by applying a voltage equal to or lower than a threshold voltage for a transmitting property in a direction perpendicular to the substrate surfaces or a voltage which causes substantially no change in the direction at an azimuth angle and causes a change only in a direction at a polar angle. That is, it is required to provide an anchoring energy at the azimuth angle that is equal to or greater than that provided by the alignment films alone to fix the alignment of the liquid crystal molecules at interfaces more strongly. As shown in FIG. 45A, if the composition sets when switching is caused by the application of a voltage higher than the threshold, the alignment regulating force of the optically setting composition is memorized in the direction indicated by the arrow 102 in the figure. As a result, as shown in FIG. 45B, the aligning direction of the liquid crystal molecules in a dark state becomes unstable after driving for a long time, and a pre-tilt occurs even when no voltage is applied. Therefore, the optically setting element may be formed such that it adds an alignment regulating force in the same direction (indicated by the arrow 101) as the alignment regulating direction of the alignment films instead of the direction different from the same (indicated by the arrow 102). Substantially no problem occurs in contrast even if there is a slight change in the alignment in the direction at a polar angle. In a mode in which there is a slight initial displacement of alignment in the direction at a polar angle, such a slight change at a polar angle may be fixed using an optically setting element, which makes not only to fix the alignment but also to improve a response speed significantly.

The liquid crystal display in the present mode for carrying out the invention will now be specifically described with reference to embodiments.

[Embodiment 7-1]

Figure 46A:
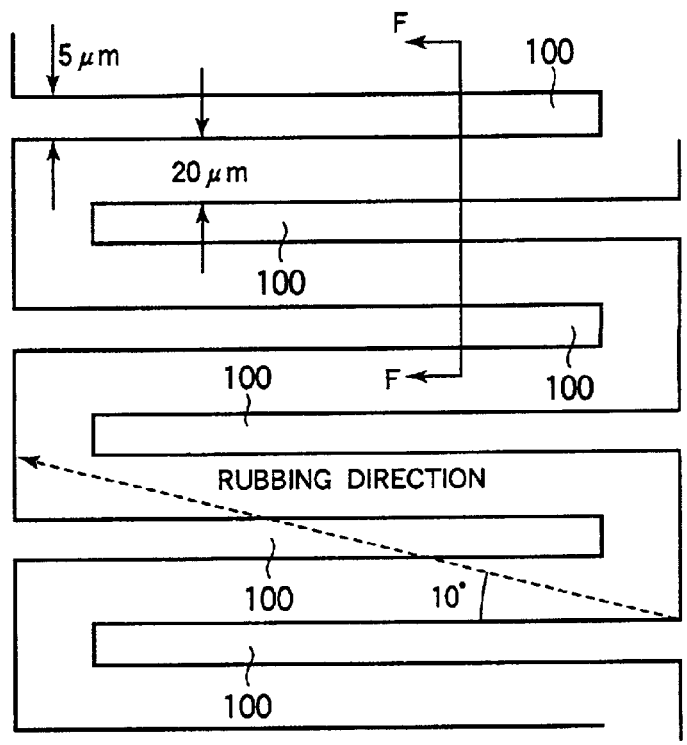
FIGS. 46A and 46B show a configuration of a liquid crystal display according to Embodiment 7-1 in the seventh mode for carrying out the invention.
Figure 46B:
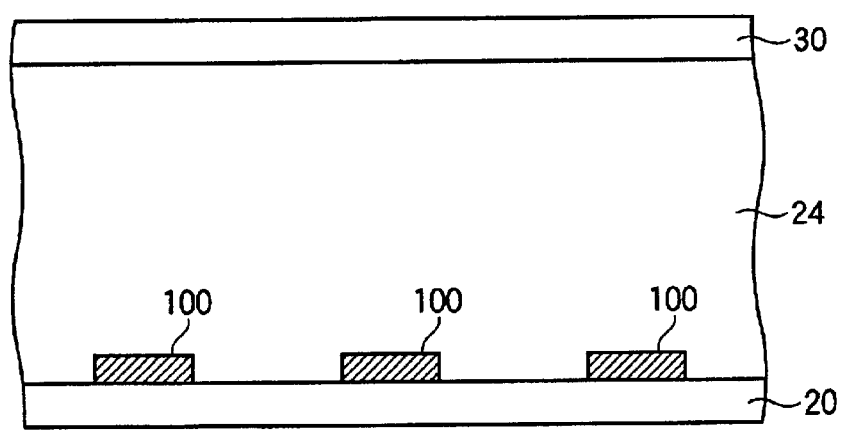

Embodiment 7-1 will be described with reference to FIGS. 46A and 46B. FIG. 46A shows a part of a pixel of a liquid crystal display according to the present embodiment, and FIG. 46B shows a section taken along the line F—F in FIG. 46A. As shown in FIGS. 46A and 46B, cells for evaluation in the IPS mode were fabricated in which comb-shaped electrodes 100 having a width of 5 $\mu$m and a gap width of 20 $\mu$m were formed on a glass substrate 20 on the array substrate. Alignment films were formed by providing a polyimide material on the substrates on a spin-coat basis. In order to provide the alignment films with five kinds of alignment regulating forces, rubbing was performed with three different strengths, and linearly polarized ultraviolet light was applied with two different intensities to provide two types of optical alignments. The direction of the alignment regulating forces at an azimuth angle was at 10 deg. to the longitudinal direction of the comb-shaped electrodes 100.

Table 3 shows results of measurement of anchoring energies at the azimuth angle on the surface of the above-described five types of alignment films carried out using the Neel Wall method, initial contrasts of the cells for evaluation during display of black, and contrasts of the cells for evaluation during display of black measured after continuously displaying white on the cell on an AC voltage for 72 hours at 35° C.

TABLE 3

|  | Anchoring energy at azimuth angle (J/m$^2$) | Initial contrast | Contrast after 72 hrs. |
| --- | --- | --- | --- |
| Rubbing 1 | 4.6 × 10$^{-5}$ | 330 | 320 |
| Rubbing 2 | 3.1 × 10$^{-5}$ | 310 | 205 |
| Rubbing 3 | 2.0 × 10$^{-5}$ | 285 | 140 |
| Optical Alignment 1 | 5.4 × 10$^{-6}$ | 220 | 145 |
| Optical Alignment 2 | 6.8 × 10$^{-7}$ | 200 | 130 |

As shown in Table 3, it was found that the shift in the aligning direction after continuous display of white for 72 hours on an AC voltage at 35° C. becomes greater to reduce contrast, the smaller the anchoring energy at the azimuth angle. However, no significant change was observed on the cell having the greatest anchoring energy at the azimuth angle.

Table 4 shows results of improvement on the above-described five types of cells for evaluation obtained by adding 0.3% by weight bifunctional acrylate monomer manufactured by Merck KGaA and by setting the injected monomer through irradiation with ultraviolet light without applying a voltage. As shown in Table 4, significant effects of improving contrast were observed in the four types of cells having smaller anchoring energies as a result of polymer fixation.

TABLE 4

|  | Initial Contrast | Contrast after 72 hrs. without polymer fixation | Contrast after 72 hrs. with polymer fixation |
| --- | --- | --- | --- |
| Rubbing 2 | 310 | 205 | 290 |
| Rubbing 3 | 285 | 140 | 280 |
| Optical Alignment 1 | 220 | 145 | 220 |
| Optical Alignment 2 | 200 | 130 | 195 |

[Embodiment 7-2]

Figure 47A:
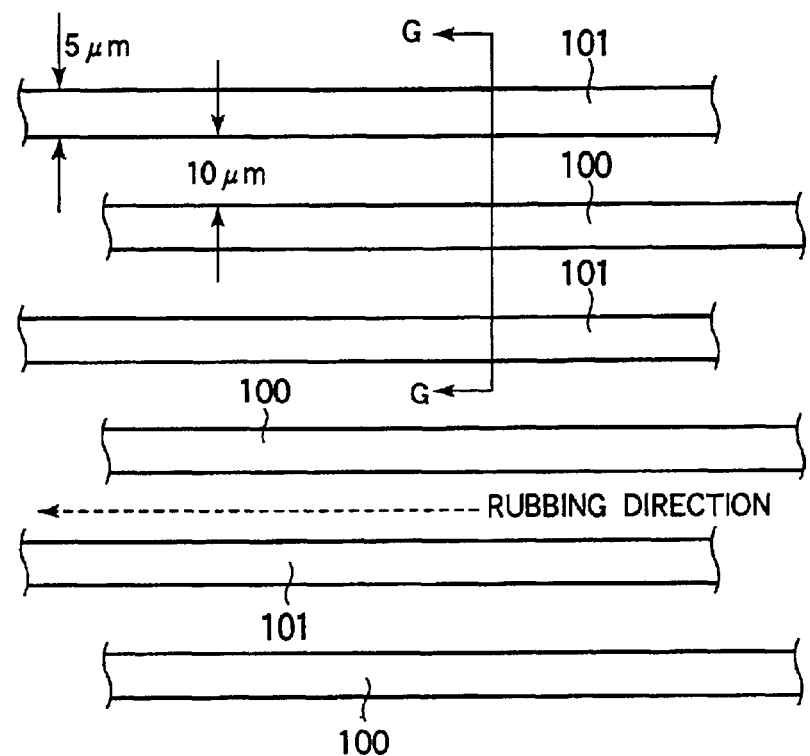
FIGS. 47A and 47B show a configuration of a liquid crystal display according to Embodiment 7-2 in the seventh mode for carrying out the invention.
Figure 47B:
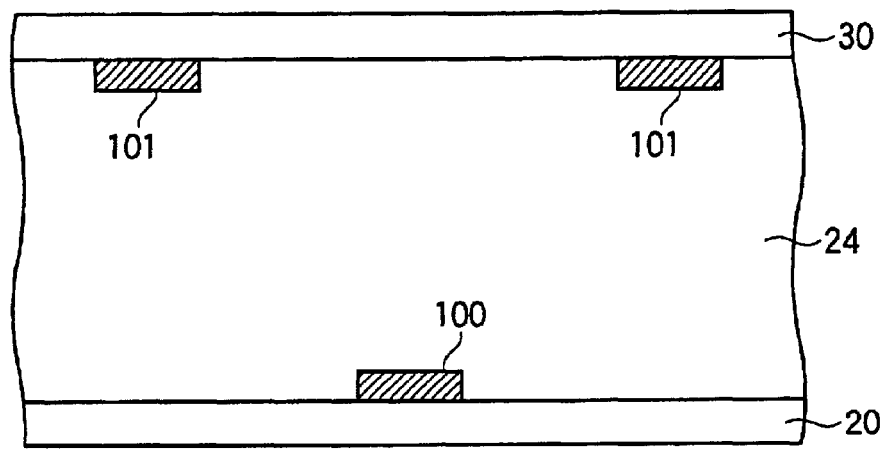

Embodiment 7-2 will be described with reference to FIGS. 47A and 47B. FIG. 47A shows a part of a pixel of a liquid crystal display according to the present embodiment, and FIG. 47B shows a section taken along the line G—G in FIG. 47A. As shown in FIGS. 47A and 47B, cells for evaluation in the diagonal field switching mode were fabricated in which comb-shaped electrodes 100 having a width of 5 μm formed on a glass substrate 20 on the array substrate and comb-shaped electrodes 101 having a width of 5 μm formed on a glass substrate 30 on the opposite substrate are alternately provided at a gap width of 20 μm as viewed in a direction perpendicular to the substrate surfaces. Alignment films were formed by providing a polyimide material on the substrates on a spin-coat basis.

In order to provide the alignment films with three kinds of alignment regulating forces, rubbing was performed with three different strengths similarly to Embodiment 7-1, and the direction of the alignment regulating forces at an azimuth angle was in parallel with the longitudinal direction of the comb-shaped electrodes 100 and 101.

Next, comparison of response speeds was carried out between three kinds of cells for evaluation as described above in which 0.3% by weight bifunctional acrylate monomer manufactured by Merck KGaA was added and set through irradiation with ultraviolet light while applying a voltage of 2.3 Vdc lower than a threshold for achieving a certain transmitting property and cells to which no monomer was added. Table 5 shows results of the same. The response speeds of the cells added with the monomers were increased. No reduction was observed in contrast and so on.

TABLE 5

|  | Contrast With polymer fixation | Response speed (without polymer fixation) | | Response speed (with polymer fixation) | |
| --- | --- | --- | --- | --- | --- |
|  |  | ON | OFF | ON | OFF |
| Rubbing 1 | >350 | 114 | 20 | 77 | 18 |
| Rubbing 2 | >350 | 110 | 23 | 75 | 18 |
| Rubbing 3 | 310 | 93 | 29 | 66 | 21 |

(Response speeds are in msec.)

As described above, the present mode for carrying out the invention makes it possible to suppress a time-dependent shift of the alignment of the liquid crystal of a liquid crystal display as a result of driving in which the switching of liquid crystal molecules includes factors in a direction at an azimuth angle. When the present mode for carrying out the invention is applied to modes in which the switching of liquid crystal molecules includes factors in a direction at a polar angle such as liquid crystal modes driven by a diagonal field, an improvement of the response speed can be also achieved to provide a high quality liquid crystal display.

As thus described, the present invention makes it possible to improve optical transmittance without reducing the speed of a response to a tone change.

What is claimed is:

1. A liquid crystal material used in a liquid crystal display, wherein the molecular weight $M_m$ of a monomer and the average molecular weight $M_{lc}$ of liquid crystal compositions except the monomer satisfy a relationship expressed by:

$$M_m < M_{lc} \times 1.5,$$

wherein a density of the monomer is in the range from 0.1 to 10% by weight inclusive.

2. A liquid crystal material according to claim 1, wherein a relationship expressed by $M_m \leq M_{lc}$ is further satisfied.

3. A liquid crystal material according to claim 1, wherein the monomer includes a polymerization initiator having a molecular weight $M_{ini}$ and wherein a relationship expressed by $M_{ini} \leq M_{lc}$ is satisfied.

4. A liquid crystal material according to claim 3, wherein the density of the polymerization initiator in the photo monomer is in the range from 0.1 to 10% by weight inclusive.

5. A liquid crystal material according to claim 1, wherein the molecular weight of the monomer is 400 or less.

6. A liquid crystal display comprising two substrates combined in a face-to-face relationship to seal a liquid crystal layer between the substrates, wherein the liquid crystal layer includes a liquid crystal material according to any of claims 1, 2, and 3 through 5.

* * * * *